United States Patent
Yakovlev et al.

(10) Patent No.: US 10,983,989 B2
(45) Date of Patent: Apr. 20, 2021

(54) ISSUE RANK MANAGEMENT IN AN ISSUE TRACKING SYSTEM

(71) Applicants: Atlassian Pty Ltd., Sydney (AU); Atlassian Inc., San Francisco, CA (US)

(72) Inventors: Andriy Yakovlev, Amsterdam (NL); Ilia Zinovev, Gdańsk (PL); Łukasz Włodarczyk, Gdańsk (PL); Daniel Rauf, Gdańsk (PL)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/724,216

(22) Filed: Dec. 21, 2019

(65) Prior Publication Data
US 2020/0410006 A1   Dec. 31, 2020

(30) Foreign Application Priority Data
Jun. 28, 2019   (AU) ................................ 2019902273

(51) Int. Cl.
*G06F 16/23* (2019.01)
*G06F 16/2455* (2019.01)
*G06Q 10/06* (2012.01)

(52) U.S. Cl.
CPC ...... *G06F 16/2379* (2019.01); *G06F 16/2455* (2019.01); *G06Q 10/06315* (2013.01); *G06Q 10/06316* (2013.01)

(58) Field of Classification Search
CPC ........ G06F 16/9038; G06F 16/93; G06F 8/70; G06F 16/2379; G06F 16/2455; G06Q 10/06315; G06Q 10/06316
See application file for complete search history.

(56) References Cited

U.S. PATENT DOCUMENTS

| | | | |
|---|---|---|---|
| 10,496,962 | B1 | 12/2019 | Bartels et al. |
| 2003/0149631 | A1 | 8/2003 | Crampton |
| 2006/0143063 | A1 | 6/2006 | Braun et al. |
| 2013/0006687 | A1 | 1/2013 | Knapp et al. |

(Continued)

OTHER PUBLICATIONS

Dietz et al. "Two algorithms for maintaining order in a list," 19th Annual ACM Symposium on Theory of Computing, New York, May 25-27, 1987. (Year: 1987).*

(Continued)

*Primary Examiner* — Jay A Morrison
(74) *Attorney, Agent, or Firm* — Brownstein Hyatt Farber Schreck, LLP

(57) ABSTRACT

Described herein is a computer implemented method for balancing a set of issues maintained by an issue tracking system, each issue in the set of issues having an original rank value. The method comprises determining a set of new rank values for the issue in the set of issues; selecting a first issue from the set of issues, the first issue being an issue from set of issues that is neither a lowest ranked issue or highest ranked issue; determining whether the first issue can be safely re-ranked based on the new rank value calculated for the first issue and original rank values of issues adjacent to the first issue; and in response to determining that the first issue can safely be re-ranked, re-ranking the first issue by assigning the new rank value determined for the first issue to the first issue.

20 Claims, 9 Drawing Sheets

(56) References Cited

U.S. PATENT DOCUMENTS

| | | |
|---|---|---|
| 2015/0081375 A1 | 3/2015 | Sloup et al. |
| 2015/0161280 A1 | 6/2015 | Pignataro et al. |
| 2015/0378722 A1 | 12/2015 | Zuniga-Hernandez et al. |
| 2016/0239777 A1* | 8/2016 | Lassau ............ G06Q 10/063116 |
| 2016/0239785 A1* | 8/2016 | Lassau ............. G06Q 10/06315 |
| 2018/0005286 A1 | 1/2018 | Grabamik et al. |
| 2019/0370755 A1 | 12/2019 | Bartels et al. |

OTHER PUBLICATIONS

Zhou et al., "Recommending Ticket Resolution," CNSM, IEEE, https://ieeexplore.ieee.org/abstract/document/7367333, 2015.

* cited by examiner

| Issue 1. Description. | Assigned to .... | Priority x. | Rank AAA |
| Issue 2. Description. | Assigned to .... | Priority x. | Rank BBB |
| Issue 3. Description. | Assigned to .... | Priority x. | Rank CCC |
| Issue 4. Description. | Assigned to .... | Priority x. | Rank DDD |
| Issue 5. Description. | Assigned to .... | Priority x. | Rank EEE |

| Issue 1. Description. | Assigned to .... | Priority x. | Rank AAA |
| Issue 2. Description. | Assigned to .... | Priority x. | Rank BBB |
| Issue 4. Description. | Assigned to .... | Priority x. | Rank DDD |
| Issue 5. Description. | Assigned to .... | Priority x. | Rank EEE |

| Issue 1. Description. | Assigned to .... | Priority x. | Rank AAA |
| Issue 4. Description. | Assigned to .... | Priority x. | Rank AAJ |
| Issue 2. Description. | Assigned to .... | Priority x. | Rank BBB |
| Issue 3. Description. | Assigned to .... | Priority x. | Rank CCC |
| Issue 5. Description. | Assigned to .... | Priority x. | Rank EEE |

Figure 5

ISSUE RANK MANAGEMENT IN AN ISSUE TRACKING SYSTEM

CROSS-REFERENCE TO RELATED APPLICATION(S)

This application claims the benefit of Australian patent application no. AU2019902273, filed Jun. 28, 2019 and titled "Issue Rank Management in an Issue Tracking System," the disclosure of which is hereby incorporated herein by reference in its entirety.

FIELD

The present disclosure generally relates to issue tracking systems.

BACKGROUND

Issue tracking systems are systems that manage the creation and tracking of issues in a variety of contexts. Issue tracking systems are variously referred to a trouble ticket systems, support ticket systems, request management systems, and incident ticket systems.

As one example, an issue tracking system may be deployed for use by a helpdesk. A busy helpdesk may manage thousands, tens of thousands, or even more issues. Each issue may have a different priority, require different actions, be handled by different people, and/or be handled by multiple different people over its lifecycle. An issue tracking system may be used to assist in managing and tracking this process. When a problem is submitted to the helpdesk an issue is created and assigned (at times with a particular priority). As the issue is worked on by various users, the progress of the issue is recorded and tracked by the issue tracking system until, ideally, the issue is solved and closed.

An important feature of issue tracking systems is the ability for issues to be ranked relative to one another. This allows issues to be prioritized at a granular level. Issue ranking is a complex problem for various reasons, including: (a) the existence of multiple users, all of whom may want to add new issues, assign priorities or re-rank existing issues; (b) automated systems that may also add new issues and/or reorder existing issues; (c) changes to the issues may occur at the same or substantially the same time; (d) multiple actors may attempt to perform different rank operations on the same (or closely ranked) issues; (e) over time issues may become congested in the sense that their rank addresses indicate consecutive ordering without any space for a new issue to be ranked in between.

SUMMARY

Embodiments described herein may relate to, include, or take the form of a computer implemented method for balancing a set of issues maintained by an issue tracking system, each issue in the set of issues having an original rank value, the method including at least the operations of: determining a set of new rank values, the set of new rank values with a new rank value for each issue in the set of issues; selecting a first issue from the set of issues, the first issue being an issue from set of issues that may be neither a lowest ranked issue or highest ranked issue; determining whether the first issue can be safely re-ranked based on the new rank value calculated for the first issue and original rank values of issues adjacent to the first issue; and in response to determining that the first issue can safely be re-ranked, re-ranking the first issue by assigning the new rank value determined for the first issue to the first issue.

Embodiments may include a configuration in which, when executed by the one or more processors, the sequences of instructions cause the one or more processors to successively select further issues from the set of issues for processing. In these and related examples, the method operation of processing a given further issue includes: determining whether the given further issue can be safely re-ranked; in response to determining that the given further issue from the set of issues can safely be re-ranked, re-ranking the given further issue and selecting another further issue for processing; and in response to determining that the given further issue from the set of issues cannot safely be re-ranked, selecting another further issue for processing without re-ranking the given further issue.

Embodiments may include a configuration in which, following selection of all issues in the set of issues, the sequences of instructions cause the one or more processors to re-select any issues that on initial selection were determined not able to be safely re-ranked, and in response to determining that a re-selected issue can safely be re-ranked, re-rank the re-selected issue.

Embodiments may include a configuration in which the first issue is an issue from the set of issues with the second lowest rank value. In these and related examples, successively selecting further issues includes selecting issues with successively higher rank values to the first issue.

Embodiments may include a configuration in which the first issue may be an issue from the set of issues with the second highest rank value. In these and related examples, successively selecting further issues includes selecting issues with successively lower rank values to the first issue.

Embodiments may include a configuration in which determining a set of new rank values includes setting a new rank value for a lowest ranked issue in the set of issues to be the original rank value of the lowest ranked issue. In these and related examples, setting a new rank value for a highest ranked issue in the set of issues to be the original rank value of the highest ranked issue.

Embodiments may include a configuration in which the method operation of determining a set of new rank values further includes: calculating new rank values for each interim issue in the set of issues, an interim issue in the set of issues being an issue with a rank value between the rank values of the lowest and highest ranked issues in the set of issues. In these and related examples, calculating new rank values for each interim issue includes calculating new rank values that are approximately equally distributed between the between the rank values of the lowest and highest ranked issues in the set of issues.

Embodiments may include a configuration in which calculating a new rank value for a given interim issue includes calculating a new rank value according to the formula: $rk = r1 + (rn-r1)/(n-1)*(k-1)$ such that: k is an index position of the given interim issue within the set of issues, k being between 1 (an index position of the lowest ranked issue in the set of issues); n (an index position of the highest ranked issue in the set of issues); rk is the new rank value for the given interim issue; r1 is the rank value of the lowest ranked issue in the set of issues; and rn is the rank value of the highest ranked issue in the set of issues Embodiments may include a configuration in which calculating a new rank value for a given interim issue further includes rounding the newly calculated rank value rk such that rk has a minimum number of rank characters, but may be still greater than a rank value of an issue with the next lowest rank value.

Embodiments may include a configuration in which, when executed by the one or more processors, the sequences of instructions cause the one or more processors to select the set of issues by, for example: determining a pivot issue maintained by the issue tracking system; adding the pivot issue to the set of issues; sequentially analyzing issues in a first direction from the pivot issue; the issues in the first direction having successively adjacent rank values in the first direction to a rank value of the pivot issue; and for each successive first direction issue in the first direction determining whether selection termination criteria are met in respect of the first direction issue, and in response to determining that selection termination criteria are not met in respect of the first direction issue, adding the first direction issue to the set of issues and proceeding to analyze the next issue in the first direction.

BRIEF DESCRIPTION OF THE DRAWINGS

In the drawings:

FIG. 5 is a three part illustration of use of a graphical user interface to reorder an issue;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Overview

The embodiments described herein relate to balancing (i.e. re-ranking) issues maintained by an issue tracking system.

As used herein, the term "issue tracking system" (which will be shortened to ITS) generally refers to a system which can be used to track "issues" or, more generally, work items. A work item is an item with associated information and an associated workflow—i.e. a series of states through which the work item transitions over its lifecycle. The workflow for a given work item may be simple (e.g. an open state and a closed state) or more complex (e.g. open, closed, resolved, in progress, reopened). The particular information and workflow associated with an work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). Many other ITS implementations in which different work items are tracked through different lifecycles are possible. The embodiments herein will be described in relation to "issues". It will be appreciated, however, that the embodiments and principles thereof may be applied to different types of work items.

One embodiment may be implemented as part of an ITS such as JIRA, which is commercially available from Atlassian Pty Ltd., Sydney, Australia.

An ITS may be provided using a variety of different architectures. One implementation is a client server architecture where the ITS functionality is provided by a server computer and accessed by users from client computers. Two examples of a client server implementation are described generally below. Alternative implementations/architectures are, however, possible. For example, in the case of small enterprises with relatively simple requirements, an ITS may be a stand-alone implementation (i.e. on a single computer directly accessed/used by the end user).

Single Server ITS Architecture

Figure 1:
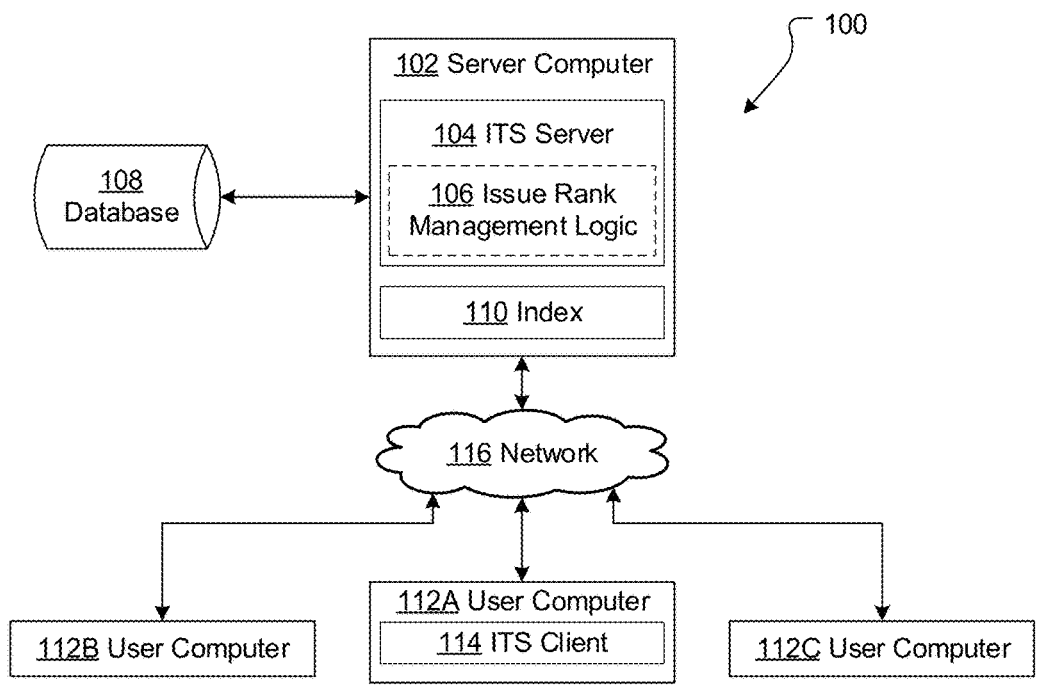
FIG. 1 illustrates a single server architecture issue tracking system.

FIG. 1 illustrates a single server implementation of an ITS 100 in accordance with one embodiment. ITS system 100 comprises a server computer 102. Server computer 102 hosts an ITS server 104 for providing server-side functionality of the ITS. The ITS server 104 comprises one or more application programs, libraries, APIs or other software elements that implement the features and functions that are further described herein. ITS server 104 may include, inter alia, issue rank management logic 106, which configures the ITS server 104 to implement issue rank operations, to initiate issue rank balancing, to select issues for balancing/re-ranking, and/or to implement issue rank balancing as described below.

Server computer 102 also stores or has access to ITS data. ITS data generally includes: ITS metadata defining the operation of the ITS (for example, and as discussed below, issue type definitions, issue workflows, user permissions and the like); and issue data (i.e. data in respect of the issues that have been entered into the ITS and are being maintained by the ITS). ITS data may, for example, be stored on a local file system of the server computer 102, a file system of another computer, and/or managed by a database such as database 108. Database 108 will typically be provided by database server operating on a separate physical computer coupled (directly or indirectly via one or more networks) to ITS server computer 102. Database 108 may however be a database server operating on server computer 102 itself.

In this particular embodiment, server computer 102 stores issue index data 110 locally, and database 108 stores additional issue data and ITS metadata. In alternative embodiments a separate index is not provided with searching being performed on the database 108.

System 100 also comprises a user computer 112. ITS Client computer hosts an ITS client 114 for providing client-side functionality of the ITS 100.

The ITS client 108 may be a general web browser application (such as, for example, Chrome, Safari, Internet Explorer, Opera) which accesses the ITS server 104 via an appropriate uniform resource locator (URL) and communicates with the ITS server 104 via general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, ACTIVE SERVER PAGES, or other forms of code. Where the ITS client 114 is a web browser, the ITS server 104 will be a web server (such as, for example, Apache, IIS, nginx, GWS). Alternatively, the ITS client 114 may be a specific application programmed to communicate with server 102 using defined application programming interface (API) calls. In this case the ITS server 104 will be a specific application server configured to interact with the ITS client application. A user computer 112 may host more than one ITS client 114 (for example a general web browser client and a specific application client). Similarly, server computer 102 may host more than one ITS server 104.

The ITS server computer 102 may serve multiple user computers 112 (or, more specifically, multiple ITS clients 114). In FIG. 1 three user computers have been depicted (112A, 112B, and 112C), though more or fewer could be used.

The server computer 102 and client computer 112 communicate data between each other either directly or indirectly through one or more communications networks 116. Communications network 116 may comprise a local area network (LAN) of an enterprise in one embodiment. In this case ITS 100 may be implemented as an on-premises solution in which the server computer 102 and user computer 106 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

Multiple Server ITS Architecture

Figure 2:
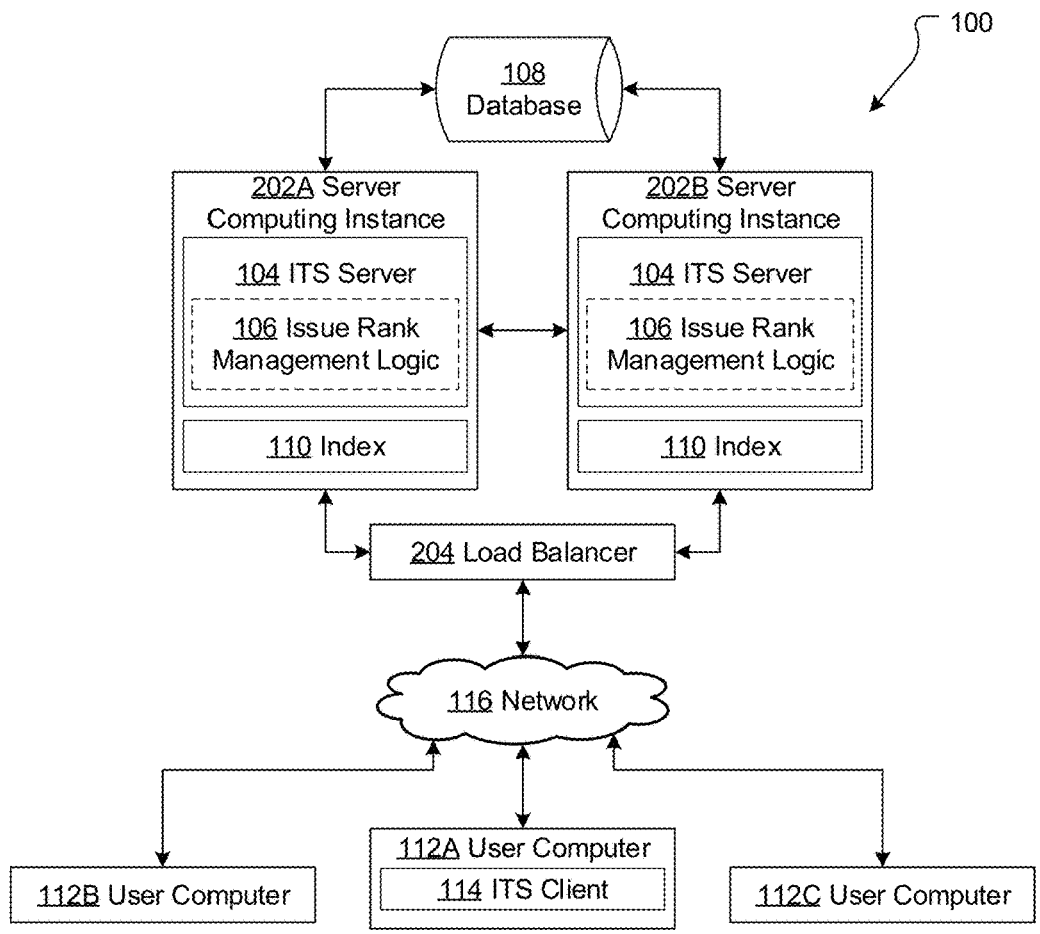
FIG. 2 illustrates a multiple server architecture issue tracking system.

FIG. 2 illustrates a multiple server (clustered) implementation of an ITS in accordance with another embodiment. In the arrangement of FIG. 2, the ITS 100 is implemented using one or more server computing instances 202 (or nodes) that are instantiated on or hosted in a shared data center or cloud computing infrastructure. Examples include AMAZON WEB SERVICES, RACKSPACE, and private cloud data centers. A server computer instance 202 is instantiated on or hosted in a computer, and in some instances a single computer may host several server computer instances 202. In FIG. 2 two server computing instances 202A and 202B have been depicted, but there may be any number of server computing instances instantiated from time to time based upon the number of ITS clients 114 that access the instances, or other performance requirements.

An executable image of each server computing instance 202 includes an ITS server 104 with issue rank management logic 106, in a similar fashion to ITS server 104 described above. Each server computing instance 202 in this embodiment also stores issue index data 110 (also described above), which during operation of the ITS is replicated across all server computing instances. In the arrangement of FIG. 2 all server computing instances access a common database 108 to store and retrieve ITS data.

From the client side, the multiple server ITS 100 arrangement of FIG. 2 is essentially the same as the single server arrangement described with respect to FIG. 1. User computers 112 host ITS clients 114 which facilitate access to the ITS server functionality over network 116. In the arrangement of FIG. 2, however, requests from ITS clients 114 are initially received by a load balancer 204 which distributes requests between the available server computing instances 202. Load balancer 204 may be a hardware or software load balancer.

In the arrangement of FIG. 2, network 116 may represent at least one internetwork, such as the public internet, in combination with one or more wired or wireless LANs, WANs, or other network access infrastructure such as cable modems, routers, etc.

General ITS Operation

This section describes the general manner in which an ITS such as ITS 100 is deployed and used.

ITS 100 maintains ITS metadata defining the operation of the ITS 100. In one embodiment this metadata includes: one or more issue type definitions, each issue type definition defining a field scheme or field configuration for issues of that type (e.g. the possible fields or data to be maintained by the ITS for issues of a given type); one or more workflow definitions, a workflow definition defining the workflow of an issue of a particular issue type (e.g. the states an issue can take and the manner in which an issue transitions between those states over its lifecycle); and user permissions (e.g. which users may create issues, view issues, amend issues, change the states of issues etc.).

ITS 100 may be configured to store a wide variety of information in respect of a given issue. By way of one simple example, an issue type definition may define the following fields: a project field storing a project to which the issue belongs; a key field storing a unique identifier for an issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). Issue ranking is described in greater detail below. In this example the priority field and the rank field store different information. A large number of issues may have the same priority (e.g. critical), however only one issue may have a given rank value. The actual fields defined with respect to an issue type will depend on the requirements of a given ITS implementation, and many other fields are possible.

Figure 3:
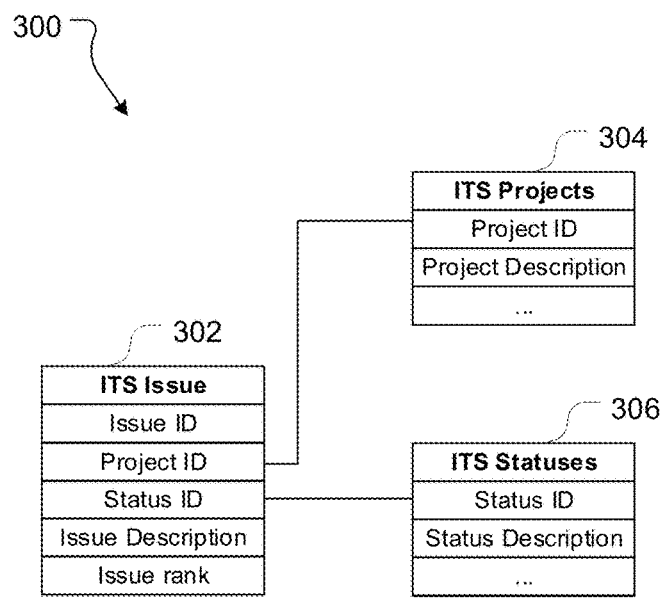
FIG. 3 illustrates one example of a relational database schema.

An ITS may maintain issues in a variety of data structures. In one embodiment issues are stored in a relational database. By way of illustration, FIG. 3 provides a partial example of a simple relational database schema 300 for an ITS. In this example, schema 300 includes: an issue table 302 comprising an issue ID field, a project ID field, a status ID field, an issue description field, and an issue rank field; a projects table 304 comprising a project ID field and a project description field; a status table 306 comprising a status ID field and a status description field. Under this partial schema each issue can only have a single issue rank at a given time. In alternative implementations the schema is defined so a given issue can concurrently have multiple ranks (allowing, for example, different users or user groups to give an issue different ranks).

Schema 300 has been provided for descriptive purposes, however a relational database schema for an ITS will typically be considerably more complex and have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. The table below provides an example of a simple single table data structure for storing issues:

| Key | Project ID | Description | Status | Priority | Rank | ... | ... |
|---|---|---|---|---|---|---|---|

Example Issue Data Structure

Figure 4:
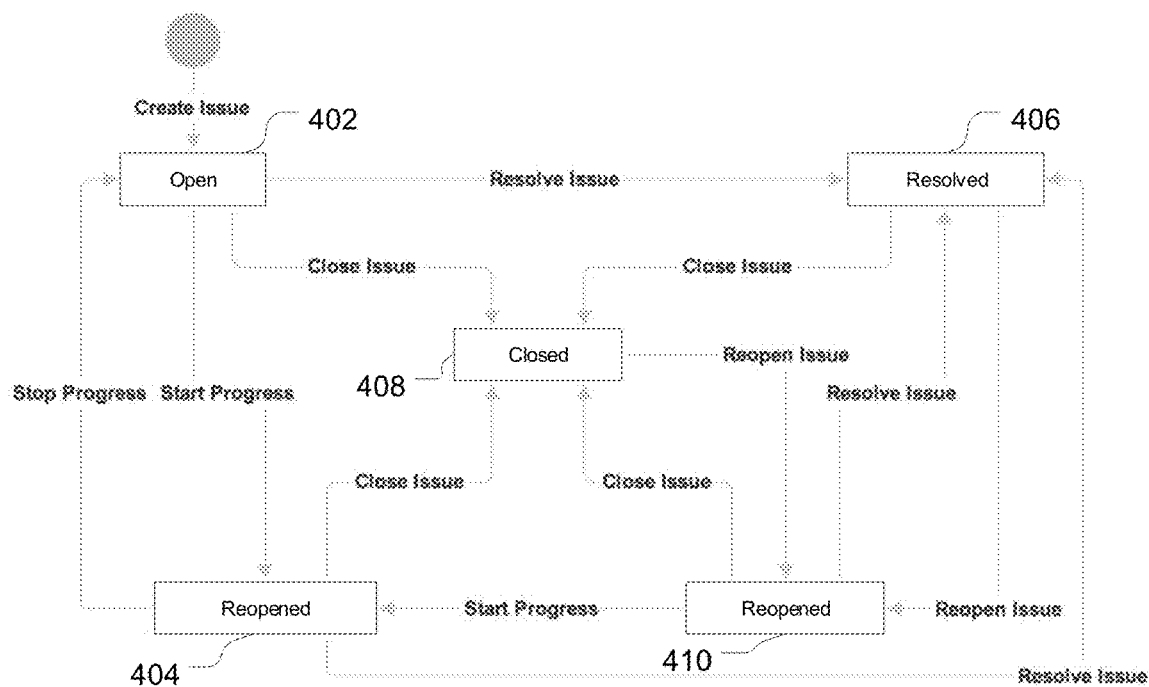
FIG. 4 illustrates one example of an issue lifecycle.

The workflow associated with a given issue will also depend on the specific requirements of the ITS implementation. By way of a simple example, FIG. 4 depicts a lifecycle 400 that could be used in a helpdesk implementation. In lifecycle 400 an issue may take (and transition between): an open state 402; an in progress state 404; a resolved state 406; a closed state 408; and a reopened state 410. Different lifecycles with different states and/or transitions between states will be appropriate for different implementations.

In order to create and progress issues in ITS 100 users interact with appropriate user interfaces provided by an ITS client 114. For example, a user may create a new issue and provide relevant information in respect of the issue (e.g. a particular project the issue is associated with, a description, a priority, any other relevant information catered for). The ITS 100 itself will typically generate a key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

Issue Ranks

As mentioned above, an issue rank value defines the order of an issue with respect to other issues. An issue ranking scheme defines the maximum allowed rank length, what values are available to be assigned to each rank character, and how rank values are ordered. The set of available rank values will be referred to as the rank address space, and is defined by the maximum allowed rank length (i.e. the total number of characters a rank value may include) and the allowed values for each of those characters. The order of the rank values is defined by an ordering system. Actual issue ranks are unique values allowing for the rank order of all issues (or of a subset/collection of the existing issues) to be established. Further, the ITS may be configured so that each issue can be assigned multiple rank values to allow for different ordering schemes. This may be appropriate, for example, where one user or group of users wishes to rank the issues tracked by the ITS differently to another user or group of users.

By way of illustration, an issue ranking scheme may define a maximum allowed rank length of four characters, and that the allowed value for each character are is a whole number 0 to 9. This defines that issue rank values are whole numbers from 0000 to 9999 (endpoints inclusive), and gives an address space size of 10,000. In this case an appropriate ordering system could be ascending numerical order—i.e. an issue with a rank value of 0000 being ranked before an issue with a rank value of 0001, an issue with a rank value of 0001 being ranked before an issue with a rank value 0002 and so forth.

Various issue ranking schemes are possible. For example, different issue ranking schemes may be defined by varying the maximum allowed rank length and/or the values a given character may take (e.g. numbers, letters, and/or symbols). Similarly, various ordering systems may be implemented—numerical ordering (which can be applied to numbers and letters—e.g. where hexadecimal is used), lexicographical ordering, or custom defined ordering systems. Applying different ordering systems will impact the ordering of the rank values. For example, in a numerical ordering system a rank value of "6" will rank before a rank value of "20". In a lexicographical ordering system, however, a rank value of "20" will rank before a rank value of "6" (though not before a rank value of "06"). In some instances the maximum rank length may be limited by the maximum field size of the data structure being used to store issues—for example some databases may impose a 255 byte (character) limit to an index field. In this case characters that are not necessary for the rank value may be dealt with trailing null characters or explicit leading zeroes. For example, a rank value of "AB" in a 6 character fixed width field could be stored as "ABØØØØ" (or "ØØØØAB") or "0000AB".

In one particular embodiment, an issue ranking scheme defines a maximum allowed rank length of 253 characters, and that each of the 253 characters is capable of being an alphanumeric character—i.e. any of 0 to 9 or A to Z. In this case each character may take any one of 36 values, providing a rank address space with 36 to the power of 253 unique ranks (and therefore capable of definitively ordering 36 to the power of 253 issues). In this embodiment a lexicographical ordering system is used to determine the order of the ranks. A lexicographical ordering scheme may be advantageous where the ITS 100 allows for full text indexing and searching of issue data (for example by using Apache Lucene), as in this case alphanumeric issue ranks can be treated as any other text field.

In certain embodiments the rank length of a particular issue's rank value is relevant. In one embodiment issue ranks are stored in a variable character (varchar) field. In this case an issue's rank length is simply the number of characters in the issue rank. For example a rank value of "AA" has a rank length of two, a rank value of "AAAAAAAA" has a rank length of eight.

In other embodiments issue ranks may be stored in a fixed size field. In this case each issue will have the number of characters defined by the size of the fixed size field (which also defines the maximum allowed rank length), irrespective of how many of the characters are actually needed. In this case characters not needed to define the rank may be assigned a special value (e.g. a null character, indicated herein as Ø). In this case the length of an issue rank value is the number of "normal" (e.g. non-special characters) in the rank value. This can be calculated in a variety of ways. For example, if trailing special characters are used the length of a rank value can be determined with reference to the index position of the last non-special character. E.g., in "ABØØØØ" the index position of the last non-special character ("B") is 2 (the index starting from 1), and the length of the rank value is 2. Alternatively, in "ABBCØØ" the index position of the last non-special character ("C") is 4 and the length of the rank value is 4. If leading special characters are used the index position of the last non-special character can again be used to calculate the length of a rank value, though in this case with reference to the size of the field. E.g., in "ØØØØAB" the index position of the first non-special character ("A") is 4 (the index in this case starting from 0), and the length of the rank value is the size of the field (6) take this index position: 6−4=2. Alternatively, in "ØØABBC" the index position of the first non-special character is 2 and the length of the rank value is (6−2)=4.

In alternative embodiments, instead of using special symbols such as null characters, rank values may be "packed" with leading characters that take the lowest possible character value. By way of example, if a ranking scheme defines that characters may take the values A-Z (and a lexicographical ordering system is used), the character 'A' is the lowest possible character value. Alternatively, if a ranking scheme defines that characters may take the values 0-9 (and an ascending numerical ordering system is used), the character '0' is the lowest possible character value. In this case, a field of 6 characters storing a rank of "102" would be stored as "000102" and a rank of "50" would be stored as "000050". In this case an issue's rank length is determined with reference to the index of the first character that takes a value other than the lowest possible character value defined by the ranking scheme. For example, rank length may be calculated by subtracting the index of the first character taking a value other than the lowest possible character value from the size of the fixed length field (the index of a character being counted from zero). Presuming the lowest value a character can take is '0', in a six character fixed size field a rank value of "000105" has a rank length of three (the numeral 1 being the first character taking a non-zero value and being in index position 3); a rank value of "000009" has rank length of one (the numeral 9 being in index position 5); a rank value of "010012" has a rank length of five (the first 1 in the value being in index position 1); a rank value of "310012" has a rank length of five (the number 3 being in index position 0).

Various ranking schemes are used for descriptive purposes herein. These ranking schemes have been selected in order to illustrate relevant features. It will be appreciated, however, that the features described can be applied to alternative ranking schemes with alternative (and typically significantly larger) maximum allowed rank lengths, different allowed character values, and/or different ordering systems.

Over the lifecycle of an issue its rank may be changed many times—either in response to a user reordering request (e.g. to increase or decrease the importance of an issue relative to other issues), or as a result of the ITS server 104 performing rank management operations (e.g. balancing issue ranks as described below). A rank operation may be initiated by a user request, for example where the user requests that an issue be reordered. In this case a user may change the issue rank value manually, for example by accessing the rank field of the issue and entering a desired value.

Alternatively, a user initiated rank operation may be the result of a user interacting with a graphical user interface provided on a user computer 112 by the ITS client 114. An example of such a user interface is depicted in FIG. 5. The user interface graphically depicts five issues, respectively identified by the numbers 1 to 5—on a display screen 502 of the user computer 112. In this example numbers 1 to 5 are simply issue identifiers (e.g. an issue name or key or the like) and do not indicate the rank of the issue which is defined by an issue rank field. Each issue is displayed with additional information—in this case, and by way of example only, a description of the issue, an assignee of the issue, and the priority of the issue. Although the rank values of the issues are depicted in FIG. 5, this need not be the case—and often actual rank values will not be displayed (particularly where they are large values that are not particularly readable to a user). The issues are displayed so that a user can tell their order intuitively without reference to the specific rank value—in this case the issues are displayed in rank order from top to bottom—i.e. in screen 504 Issue 1 is above and ranked before Issue 2, Issue 2 is above and ranked before Issue 3 etc. During interaction with the ITS 100 a user may wish to reorder an issue. For example a user may wish to rank Issue 4 between Issue 1 and Issue 2. To do so the user manipulates Issue 4, for example by dragging and dropping Issue 4 into the desired order (e.g. by interaction with a touch screen display, by use of a mouse or other pointing device, or by keyboard commands). Screen 506 depicts a point in time in the user interface where the user has selected Issue 4 and started moving it, and screen 508 shows the completed operation. In screen 508 the user can now visually see that Issue 4 has been ranked after Issue 1 and before Issue 2. In the background, and as described in further detail below, the ITS server has performed a rank operation to adjust the rank of at least Issue 4 in order to reflect the changed order of the issues. In this particular case Issue 4 has been given a rank value of AAJ, which sits between the rank value of Issue 1 ("AAA") and the rank value of Issue 2 ("BBB").

This specification describes the balancing (or rebalancing) of issues. In balancing operations, the rank values of issues are changed (i.e. issues are re-ranked), but their order is not. After a balancing operation a given issue is ranked before all issues it was ranked before prior to the balancing operation and is ranked after all issues it was ranked after prior to the balancing operation.

Balancing Issues

Over the course of operation of the ITS 100 issues are added and issue orders and rank values are modified. This may result in one or more areas of the issue rank address space becoming congested.

Congestion here refers to issues being assigned ranks that are close together such that the number of rank values between adjacent issues (i.e. rank values that can be assigned to other issues that may need to be reordered between those issues) becomes relatively small or even zero.

Typically congestion in an issue rank space is local congestion only. An ITS 100 will typically implement an issue rank scheme that defines a rank address space with significantly more ranks than the number of issues that will ever need to be ranked by the ITS 100. By way of example, consider the example address space described above which provides 36 to the power of 253 unique issue ranks. It is assumed that the ITS 100 would, however, never have need to store/track 36 to the power of 253 issues—for example, at the time of filing this application a relatively large number of issues for an ITS is considered to be 1 million issues. Accordingly, although certain areas or regions of the address space may become bunched or congested, other areas of the issue address space will be uncongested/sparsely populated.

For example, over the course of operation of the ITS 100 four issues may end up with the ranks as shown in the table below (presuming a maximum allowed rank length of three alphanumeric characters and a lexicographical ordering scheme).

| Issue identifier | Issue Rank |
|---|---|
| 1 | AAA |
| 2 | DDA |
| 3 | DDB |
| 4 | DDC |
| 5 | FFF |

Example Issue Ranks

Should, for example, a reordering operation requesting issue 1 to be ranked after issue 3, the reordering operation cannot be completed. Given the maximum character limit of three that has been adopted for this example it is not possible to add an additional character to the rank (e.g. modifying the rank of issue 1 to be "DDBA" which would then rank between "DDB" and "DDC"). It is also not possible to select a rank falling between DDB and DDC as under the ordering system these are adjacent ranks. This illustrates the local congestion of ranks around issue 3 and issue 4 (having rank values of DDB and DDC respectively). It also illustrates that there is relatively limited (or no) congestion in other areas—there being a large number of available ranks between issue 1 and issue 2 (having rank values of AAA and DDA respectively) and between issue 4 and issue 5 (having rank values of DDC and FFF respectively).

In this example, the only way to rank issue 1 between issue 3 and issue 4 without changing the underlying issue rank scheme is to re-rank at least one of issue 3 or issue 4 to create available issue ranks between them. This type of operation will be referred to as an issue balancing operation. In an issue balancing operation the rank values of one or more issues are changed, but the order of the issues maintained by the ITS 100 is not altered—i.e. after a balancing operation no issue has changed to be ordered before an issue it was previously ordered after, or to be ordered after an issue it was previously ordered before.

The inventors have identified that rank space congestion is typically localized—that is, issues with relatively longer ranks tend to form local clusters within the rank address space. In order to alleviate rank space congestion such as this, the present disclosure provides operations and processes for balancing issues.

Figure 6A:
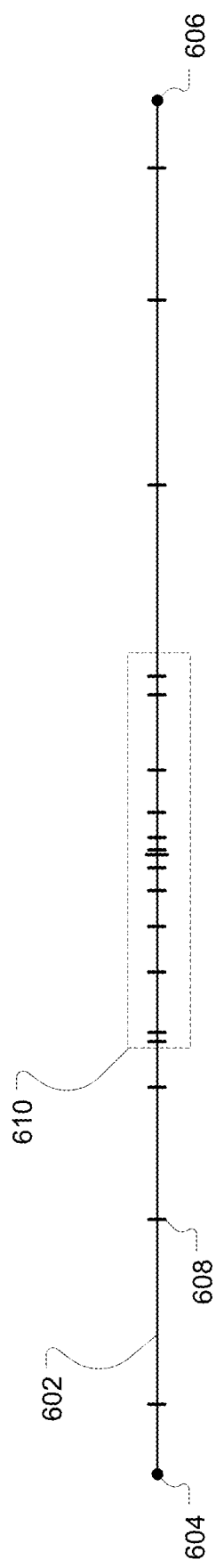
FIGS. 6A and 6B depict localized issue congestion in an issue ranking scheme.
Figure 6B:
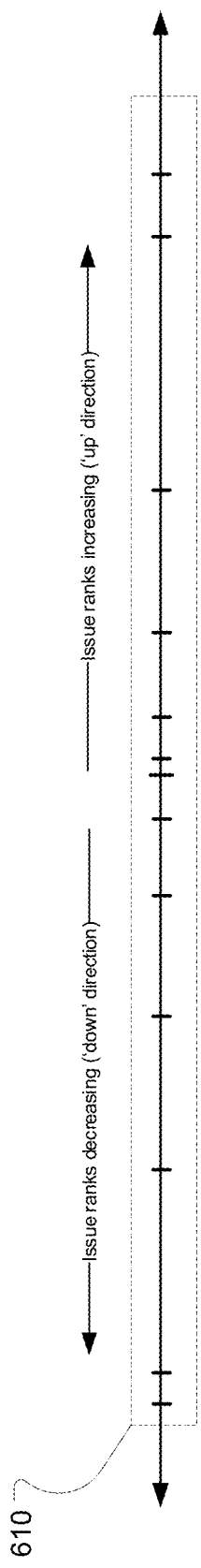

FIGS. 6A and 6B provides a visual depiction of an issue rank address space with localized congestion. In FIG. 6A, horizontal line 602 represents the entire rank address space with the lowest rank address 604 on the left and highest possible rank address 606 on the right. The vertical bars 608 depict individual issues ranked at various points within (along) the rank address space, with issues within the broken line rectangle 610 being an area of local congestion. FIG. 6B depicts a zoom-in on the locally congested area 610.

Localized Balancing Overview

Figure 7:
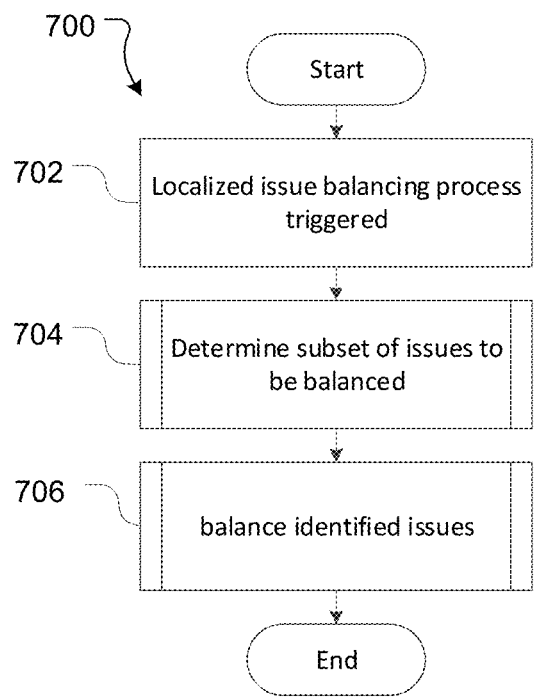
FIG. 7 provides a high level overview of a localized issue balancing process.

Turning to FIG. 7, a high level overview of a localized issue balancing process 700 will be described. The operations of the localized balancing process herein will be described as performed by the issue tracking system server 104. In certain embodiments, these operations are performed by the rank management logic 106 operating on the ITS server 104, however the operations could be performed by any appropriate software or hardware application or module with read/write access to the issue data (e.g. as maintained on database 108).

At 702, the localized issue balancing process is triggered. The process may be triggered in various ways.

For example, the balancing process may be triggered manually (i.e. by a user interaction initiating the balancing process).

Alternatively, the ITS server 104 can be configured to periodically perform an automated scan of the issue address space and trigger the balancing process if an issue is identified having a rank length exceeding a defined balance trigger threshold (the actual threshold depending on the particulars of the rank address space—e.g. the number of available characters). Such an issue will be referred to as a threshold rank length issue. In this case the ITS server 104 may be configured to repeat the rebalance process until either a predefined number of repeats has been performed or there are no further issues with a rank length exceeding the trigger threshold.

Alternatively, the ITS server 104 can be configured to periodically perform an automated scan of the issue address space to determine the longest rank length currently used, selecting an issue having that rank length, and triggering the balancing process on the selected issue. Such an issue will be referred to as a longest rank length issue, noting that there may be several issues having the same longest rank length.

Further alternatively, the ITS server 104 can be configured to automatically trigger the balancing process if an issue ranking operation results in a rank having a rank length exceeding a defined balance trigger threshold being created. In this case the balancing process may be configured to start immediately or at a later time (e.g. a period of time when server activity is likely to be low). A trigger process such as this is described in section 4 of U.S. Pat. No. 10,282,685 titled "Issue rank management in an issue tracking system", the contents of which are incorporated herein by reference.

At 704, the ITS server 104 determines which issues are to be balanced in the balancing process—this will typically be a subset of all issues maintained by the ITS. In the described implementation, issues to be balanced are flagged by being added to an issues-to-balance data structure. This process is described below with reference to FIGS. 8 and 9.

At 706, the ITS server 104 balances the issues determined at 704. This process is described below with reference to FIG. 10. The issue balancing process is then complete.

Issue Selection Process

Figure 8:
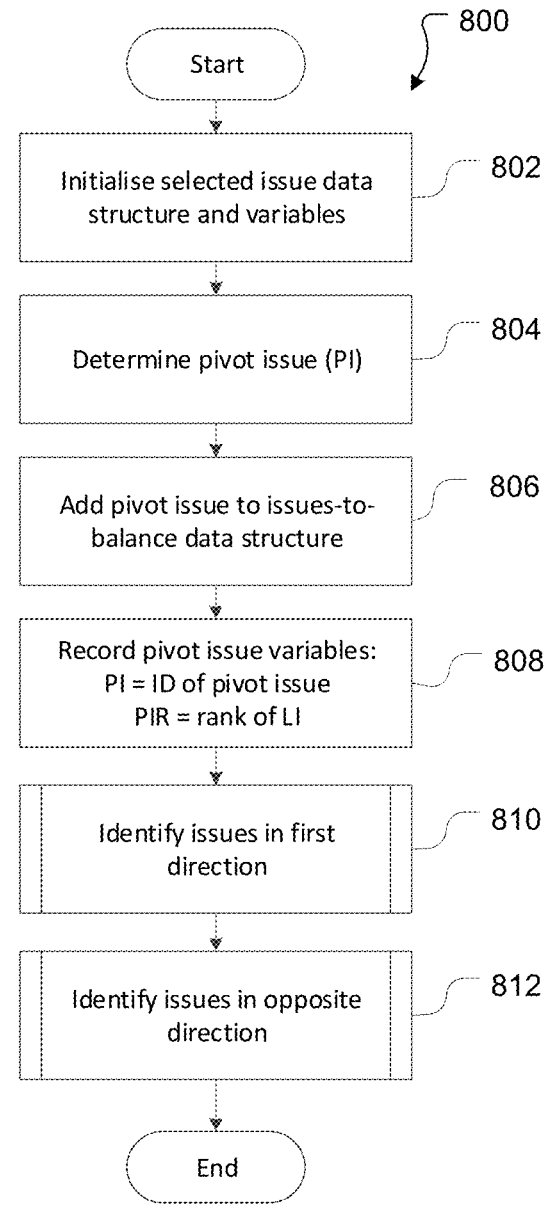
FIG. 8 is a flowchart depicting operations involved in a process performed to select issues that are to be balanced.

Turning to FIGS. 8 and 9, an issue selection process 800 performed to select issues to be balanced will be described.

Generally speaking, the issue selection process involves first identifying a pivot issue. In some cases, the pivot issue will be the issue maintained by the ITS that has the longest rank length (rank lengths being described above). In other cases, the pivot issue may be any single issue maintained by the ITS that has a rank length exceeding a predetermined rank length threshold.

More generally, the issue selection process can be performed using any pivot issue. Given the observation that congestion tends to occur around issues with a long rank length, however, identifying the pivot issue as one having the longest rank length or a rank length exceeding a predetermined threshold will typically be advantageous.

Following identification of the pivot issue, the ITS server 104 then sequentially analyses adjacent issues to either side of the pivot issue to select additional issues to be balanced. Analysing issues to either side of the longest rank issue involves sequentially analysing issues with increasingly lower ranks to that of the pivot issue (referred to as selecting issues in the descending direction) and analyzing issues with increasingly higher ranks to that of the pivot issue (referred to as selecting issues in the ascending direction).

At 802, the ITS server 104 initializes an issues-to-balance data structure and variables involved in the issue selection process.

The issues-to-balance data structure is used to record the set of issues that are to be balanced, and is updated throughout the issue selection process 800 to record identifiers of issues that are selected to be balanced. Any appropriate data structure can be used—e.g. an array, a comma (or other separated) string of issue identifiers, a table, or alternative data structure. In certain embodiments, the issues-to-balance data structure is a table with records including issue identifiers and the ranks of the issues to which those identifiers relate. An example of such a data structure is illustrated in the table below:

| Issue Identifier | Issue rank |
|---|---|
| | |

Example Issues-to-Balance Data Structure

In alternative embodiments, the issues-to-balance data structure records only issue identifiers (noting the corresponding issue ranks can be retrieved using those identifiers, e.g. from database 108).

While the present implementation uses a single issues-to-balance data structure alternative embodiments may generate and maintain two issues-to-balance data structures, e.g. a lower ranked issues-to-balance data structure (storing issues with lower ranks to that of the pivot issue) and a higher ranked issues-to-balance data structure (storing issues with higher ranks to that of the pivot issue).

The table below outlines variables involved in the issue selection process of the present embodiment:

| Variable | Short hand | Value |
|---|---|---|
| Pivot issue | PI | The issue ID of the pivot issue identified (e.g., in some cases the issue with the longest rank length). |
| Pivot issue rank | PIR | The rank of the pivot issue. |
| Subject issue | SI | The identifier of the issue currently being analysed. |
| Subject issue rank | SIR | The rank of subject issue |
| Minimum rank length | MinRL | A minimum rank length below which balancing will not be performed. |
| Maximum rank distance | MaxRD | A maximum rank distance from the rank of the pivot issue (i.e. PIR) that will be considered for a given issue selection process. |

Example Issue Selection Process Variables

In this example, the subject issue (SI) is effectively a pointer to the current issue being analysed.

In the present embodiment, rank variables are recorded though the issue selection process (i.e. PIR, SIR). In alternative embodiments ranks need not be maintained but are instead retrieved (e.g. from database 108) as needed using the relevant issue identifier (i.e. the PI, SI).

Certain stages of the issue selection process involve calculating the rank distance between two issue ranks. The rank distance between two issues (or between two issue ranks) is the number of intervening rank space addresses between those two ranks. As an example, where issue ranks are whole numbers (or can be converted into whole numbers), rank distance can be calculated for two issues A and B as the absolute value of the rank of issue A minus the rank of issue B, minus one. I.e.: |(rank of issue A)−(rank of issue B)|−1. For example, and assuming a numeric ranking scheme of 3 digits for simplicity (e.g. 000 to 999), if issue A has a rank of 1 and issue B has a rank of 2, the rank distance between issue A and issue B is zero: $||-2|-1=0$. If issue A has a rank of 1 and issue B has a rank of 3, the rank distance between issue A and issue B is one: $||-3|-1=1$ (i.e. there is one intervening rank—rank 2—between the issues). If issue A has a rank of 145 and issue B has a rank of 800, the rank distance between issue A and issue B is: $||45-800|-1=654$.

The minimum rank length (MinRL) and maximum rank distance (MaxRD) are used to constrain the number of issues that are selected for inclusion in the balancing process. The specific values selected for MinRL and MaxRD will depend on the particular implementation and factors such as the number of issues being maintained by the system and the available rank address space. By way of example, however, in a lexicographical issue ranking scheme having 253 characters with an alphabet of 0-9 and a-z (thus providing $36^{253}$ available ranks), the minimum rank length may be set to 8 characters and the maximum rank distance may be set to 10000 ranks.

In the present embodiment, the minimum rank length (MinRL) and maximum rank distance (MaxRD) are implemented as variables. In alternative embodiments, either or both the MinRL and MaxRD may instead set as system constants.

While the example issue selection process will be described using the variables discussed above, alternative issue selection processes can be implemented in which additional, fewer, or alternative variables (and/or constants) are used.

At 804, the ITS server 104 determines the pivot issue for the issue selection process. In certain implementations, the pivot issue may be identified as part of the balance triggering process and passed to the issue selection process 800 as an input. As noted above, in certain cases the pivot issue may be an issue with the longest rank length.

At 806, the ITS server 104 adds the pivot issue to the issues-to-balance data structure—e.g. by writing at least the identifier of the pivot issue thereto.

At 808, the ITS server 104 records the pivot issue variables. In the present embodiment, this involves the ITS server 104 writing the identifier of the pivot issue to the pivot issue ID variable (PI) and writing the rank of that issue to the pivot issue rank variable (PIR).

Following 808, the ITS server 104 commences analysis of the issues to either side of the pivot issue. In the present embodiment this involves sequentially processing in a first direction 810 (e.g. the descending direction—issues with increasingly lower ranks to the pivot issue) then the processing in the opposite direction 812 (e.g. the ascending direction—issues with increasingly higher ranks to the pivot issue). The lower/higher ranked issues can be analysed in any order (i.e. descending then ascending or vice versa) or the ITS server 104 could be configured to process in both directions in parallel.

Figure 9A:
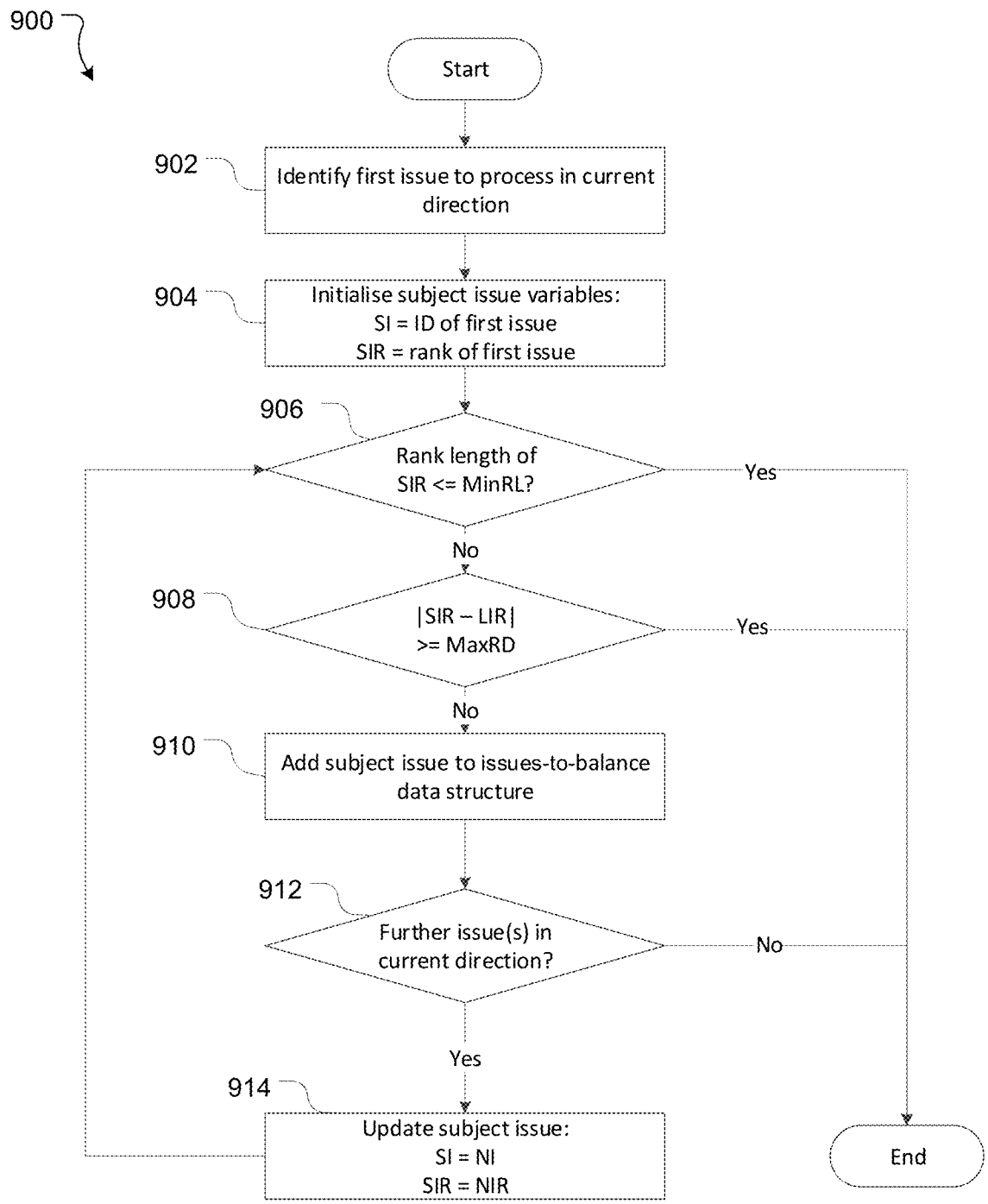
FIGS. 9A and 9B are flowcharts illustrating processes for selecting issues ranked above and below a pivot issue and that are to be rebalanced.

Two embodiments of the processing performed in a given direction are described below with reference to processes 900 and 950 of FIGS. 9A and 9B respectively. In these embodiments, the operations involved in processing in the ascending and descending directions are the same. In alternative embodiments, however, the processing in different directions need not be the same. For example, if desired different MinRL and/or MaxRD values could be selected for processing in the different directions Once both directions have been processed issue selection process 800 is complete.

Process 900

Turning to FIG. 9, an example process 900 for identifying issues to be balanced in a given direction from the pivot issue in accordance with one embodiment will be described.

Generally speaking, process 900 involves processing issues in the given direction sequentially from the pivot issue—i.e. issues having successively adjacent rank values in the given direction. Each issue is analysed to determine whether one or more selection termination criteria are met. If one or more of the selection termination criteria are met, the issue is not selected for balancing and processing in the given direction ends. If none of the selection termination criteria are not met, the issue is selected for balancing and processing in the given direction continues (by selecting the next issue in the given direction).

In process 900, the selection termination criteria are that: the current issue is the final issue maintained by the ITS in the current direction; the rank length of the current issue is less than the minimum rank length; or the rank distance between the rank of the current issue and the pivot issue rank exceeds the maximum rank distance.

At 902, the ITS server 104 identifies the first issue to be processed in the given direction. When processing in the descending direction, the first issue to be processed is the issue having the next lowest rank to that of the pivot issue. When processing in the ascending direction, the first issue to be processed is the issue having the next highest rank to that of the pivot issue.

At 904, the ITS server 104 initializes the subject issue variables to reflect the issue identified at 902. This involves the ITS server 104 writing the issue ID of the issue identified at 902 to the subject issue ID variable (SI) and the rank of the issue identified at 904 to the subject issue rank variable (SIR).

At 906, the ITS server 104 determines whether the rank length of the current subject issue (SIR) is less than or equal to the minimum rank length (MinRL). I.e., the ITS server 104 evaluates the condition: SIR rank length <=MinRL. If this evaluates true, processing in the given direction is complete. If this evaluates false, processing continues to 908.

At 908, the ITS server 104 determines whether the rank distance between the rank of the current subject issue (SIR) and the rank of the pivot issue (PIR) exceeds the maximum rank distance (MaxRD). I.e., the ITS server 104 evaluates the condition: |SIR—PIR|>MaxRD. If this evaluates true, processing in the given direction is complete. If this evaluates false, processing continues to 910.

At 910, the ITS server 104 adds the current subject issue to the issues-to-balance data structure—e.g. by writing at least the identifier of the issue (SI) to the balance data structure.

At 912, the ITS server 104 determines whether there are further issues to consider in the current direction. When processing in the descending direction, this involves determining whether there is an issue with a lower rank to that of the current subject issue. When processing in the ascending direction, this involves determining whether there is an issue with a higher rank to that of the current subject issue.

If, at 912, the ITS server determines there are no further issues in the current direction, processing in the given direction is complete.

If, at 912, the ITS server determines there is a further issue in the current direction, processing continues to 914. At 914, the ITS server updates the subject issue variables to reflect the next issue in the current direction as identified at 910. This involves the ITS server 104 writing the issue ID of the issue identified at 910 to the subject issue ID variable (SI) and the rank of the issue identified at 910 to the subject issue rank variable (SIR). Processing then returns to 906.

Process 950

Figure 9B:
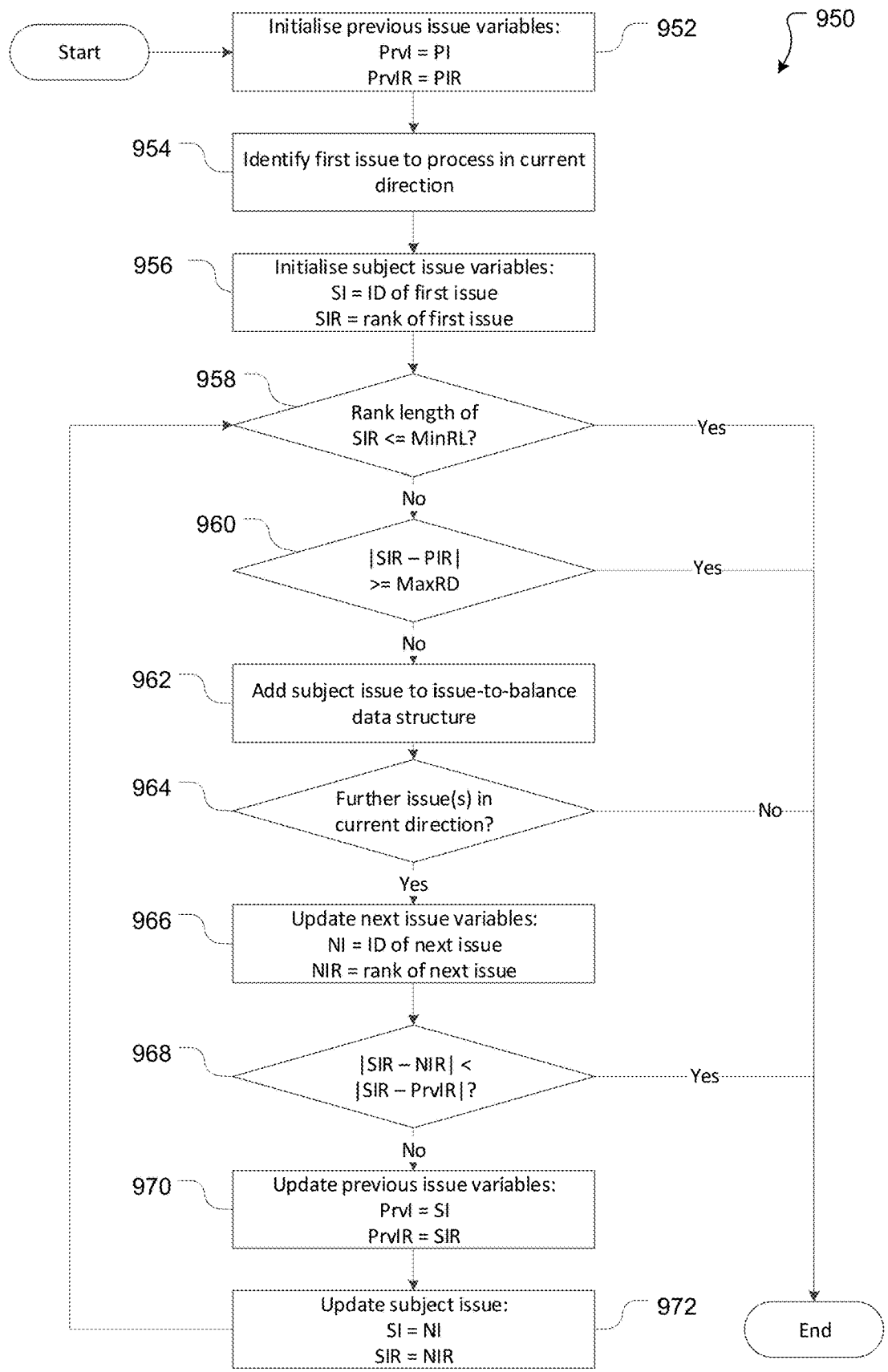

Turning to FIG. 9B, an alternative process 950 for identifying issues to rebalance in a given direction from the pivot issue will be described.

Process 950 is similar to process 900 however adds an additional selection termination criterion, namely that an issue will not be selected (and the selection process in the given direction will stop) if the rank distance between the rank of the current issue being considered and the rank of the next issue to be considered is less than the rank distance between the rank of the current issue being considered and the rank of the previously considered issue. As a consequence, the set of issues selected by process 950 is such that the biggest rank distances between neighbors occur at the ends of the range and the smallest rank distances between neighbors occur adjacent the pivot issue. Phrased alternatively, the issues selected by process 950 form two monotonic non-increasing sequences: a first sequence from the issue with the lowest rank to the pivot issue; a second sequence from the issue with the largest rank to the pivot issue. This can be advantageous in some instances.

In order to perform this additional check, additional variables are used in process 1000. These are indicated in the table below:

| Variable | Short hand | Value |
|---|---|---|
| Pivot issue | PI | The issue ID of the issue with the longest rank. |
| Pivot issue rank | PIR | The rank of the issue with the longest rank. |
| Subject issue | SI | The identifier of the issue currently being analysed. |
| Subject issue rank | SIR | The rank of subject issue |
| Next issue | NI | The identifier of the issue immediately next to the subject issue. When processing in the 'descending' direction, the next issue is the issue with the next lowest rank to the rank of the current subject issue. When processing in the 'ascending' direction, the next issue is the issue with the next highest rank to the rank of the current subject issue. |
| Next issue rank | NIR | The rank of next issue. |
| Preceding issue | PrvI | The identifier of the issue immediately preceding to the subject issue. When processing in the 'descending' direction, the preceding issue is the issue with the next highest rank to the rank of the current subject issue. When processing in the 'ascending' direction, the preceding issue is the issue with the next lowest rank to the rank of the current subject issue. |
| Preceding issue rank | PrvIR | The rank of the preceding issue. |

-continued

| Variable | Short hand | Value |
|---|---|---|
| Minimum rank length | MinRL | A minimum rank length below which balancing will not be performed. |
| Maximum rank distance | MaxRD | A maximum rank distance from the rank of the pivot issue (i.e. PIR) that will be considered for a given issue selection process. |

Example Issue Selection Process Variables

In this embodiment, the subject issue (SI), previous issue (PrvI), and next issue (NI) are effectively pointers to the current issue being analysed, the previous issue being analysed, and the next issue to be analysed respectively.

Once again, rank variables are recorded though the issue selection process (i.e. PIR, SIR, NIR, and PrvIR)—however these could instead be retrieved using the corresponding issue identifiers (i.e. the PI, SI, NI, and PrvI).

At 952, the ITS server 104 initialises the previous issue to be the pivot issue. To do so the ITS server 104 writes the value of the pivot issue ID variable (PI) to the previous issue ID variable (PrvI) and the value of the pivot issue rank variable (PIR) to the previous issue rank variable (PrvIR).

At 954, the ITS server 104 identifies the first issue to be processed in the direction that is being processed. When processing in the descending direction, the first issue to be processed is the issue having the next lowest to that of the pivot issue. When processing in the ascending direction, the first issue to be processed is the issue having the next highest rank to that of the pivot issue.

At 956, the ITS server 104 initializes the subject issue to reflect the issue identified at 954. This involves the ITS server 104 writing the issue ID of the issue identified at 954 to the subject issue ID variable (SI) and the rank of the issue identified at 954 to the subject issue rank variable (SIR).

At 958, the ITS server 104 checks whether the rank length of the current subject issue (SIR) is less than or equal to the minimum rank length (MinRL). I.e., the ITS server 104 evaluates the condition: rank length of SIR <=MinRL. If this evaluates true, processing in the given direction is complete. If this evaluates false, processing continues to 960.

At 960, the ITS server 104 checks whether the rank distance between the rank of the current subject issue (SIR) and the rank of the pivot issue (PIR) exceeds the maximum rank distance (MaxRD). I.e., the ITS server 104 evaluates the condition: |SIR−PIR|>MaxRD. If this evaluates true, processing in the given direction is complete. If this evaluates false, processing continues to 962.

At 962, the ITS server 104 adds the current subject issue to the balance data structure—e.g. by writing at least the identifier of the issue (SI) to the balance data structure.

At 964, the ITS server 104 determines whether there are further issues to consider in the current direction. When processing in the descending direction, this involves determining whether there is an issue with a lower rank to that of the current subject issue. When processing in the ascending direction, this involves determining whether there is an issue with a higher rank to that of the current subject issue.

If, at 964, the ITS server determines there are no further issues in the current direction, processing in the given direction is complete.

If, at 964, the ITS server determines there is a further issue in the current direction, processing continues to 966. At 966, the ITS server 104 updates (or initialises in the first processing cycle) the next issue variables to reflect the next issue in the current direction as identified at 964. This involves the ITS server 104 writing the issue ID of the issue identified at 964 to the next issue ID variable (NI) and the rank of the issue identified at 964 to the next issue rank variable (NIR).

At 968, the ITS server 104 calculates if the rank distance between the rank of the current subject issue (SIR) and the rank of the next issue (NIR) is smaller than the distance between the current subject issue (SIR) and the previous issue (PrvIR).

In one implementation this is involves the ITS server 104 calculating the absolute value of the current subject issue rank minus the next issue rank to see whether this is less than the absolute value of the current subject issue rank minus the previous issue rank. I.e.: the ITS server 104 evaluates the condition |SIR−NIR|<|SIR−PrvIR|. If this evaluates true, processing in the given direction is complete. If this evaluates false, processing continues to 970.

At 970, the ITS server 104 updates the previous issue variables to point to the current subject issue. To do so, the ITS server 104 writes the value of the subject issue ID variable (SI) to the previous issue ID variable (PrvI) and the value of the subject issue rank variable (SIR) to the previous issue rank variable (PrvIR).

At 972, the ITS server 104 updates the subject issue variables to point to the next issue (as identified at 964). To do so, the ITS server 104 writes the value of the next issue ID variable (NI) to the subject issue ID variable (SI) and the value of the next issue rank variable (NIR) to the subject issue rank variable (SIR).

Following 972 processing returns to 958 to perform the next processing cycle in the current direction.

In processes 900 and 950 described above, the ITS server 104 determines whether the rank distance between the rank of the current subject issue (SIR) and the rank of the pivot issue (PIR) exceeds the maximum rank distance (MaxRD) by evaluating the condition |SIR−PIR|>MaxRD in each processing loop (e.g. at 908 and 960). In alternative implementations, the ITS server 104 instead uses the MaxRD value to calculate a terminal rank value (e.g. while initializing other variables at 904/956) then at 908/960 determines whether the maximum rank distance (MaxRD) has been exceeded by comparing the rank of the current subject issue (SIR) with the terminal rank value. When processing in the ascending direction, the terminal rank value is calculated by adding the maximum rank distance (MaxRD) to the rank of the pivot issue (PIR) and the maximum rank distance check at 908/960 is whether the rank of the current subject issue is greater than the terminal rank value. When processing in the descending direction, the terminal rank value is calculated by subtracting the maximum rank distance (MaxRD) from the rank of the pivot issue (PIR) and the maximum rank distance check at 908/960 is whether the rank of the current subject issue is less than the terminal rank value.

Processes 900 and 950 described above illustrate various selection termination criteria. Processes 900 and 950 can be modified to check the selection termination criteria in different orders, and/or to impose fewer, additional, or alternative selection termination criteria.

For example, the ITS sever 104 can be configured to limit the total number of issues that are selected for balancing (i.e. that are added to the issues-to-balance data structure at 910 or 962). Such a termination criteria can be implemented in various ways. For example, the ITS server 104 can be configured to define a further variable for the issue selection process representing the maximum number of issues to be selected (e.g. MaxI). The ITS server 104 is then configured to stop evaluating/selecting issues to add to the issues-to-balance data structure if the number of issues selected reaches the maximum number of issues (MaxI). A suitable maximum number of issues will depend on the particular implementation, but by way of example setting the maximum number of issues to 10000 will be appropriate in some cases.

This check could be performed, for example, by introducing a further determination step in which the ITS server 104 ceases adding issues to the issues-to-balance data structure once the maximum number of issues has been reached. This check could be performed, for example, by introducing a further determination step after adding an issue to the issue-to-balance data structure (e.g. following 910 in process 900 or following 962 in process 950): if the number of issues that have been added to the issue-to-balance data structure is less than the maximum number of issues (MaxI) processing continues, otherwise processing in the given direction is complete.

The maximum number of issues to be selected may be implemented as the maximum number of issues that can be selected during processing in a given direction. In this case, MaxI=n indicates that a maximum of n issues will be selected in the ascending direction and a maximum of n issues will be selected in the descending direction and, therefore, at most 2 n issues will be selected for balancing. In this case, if the maximum number of issues in total is (for example) 10000, then the maximum number of issues in each direction will be set to 5000.

Alternatively, the maximum number of issues to be selected may be a total number of issues that will be selected. In this case, MaxI=n indicates that at most n issues will be selected for balancing. This can be achieved in various ways. For example, when processing in the first direction the ITS 104 can be configured to add at most n/2 (or the floor/ceiling of n/2) issues to the issues-to-balance data structure. When processing the second direction, the ITS 104 then calculates the number of remaining issues (i.e. the maximum number of issues minus the number of issues added to the issues-to-balance data structure while processing in the first direction) and sets that value as the maximum number of issues that can be added to the data structure during processing in the second direction.

Still further, the ITS 104 can be configured to impose separate (and different) maximum number of issues variables for each direction—e.g. Max ascending issues=n (defining that the maximum number of issues that can be added when processing in the ascending direction is n) and Max descending issues=m (defining that the maximum number of issues that can be added when processing in the descending direction is m). In this case the maximum number of issues that can be selected for balancing is n+m.

Issue Selection Embodiments

Further examples of specific feature combinations taught within the present disclosure are set out in the following numbered clauses:

ISE clause 1: A computer implemented method for selecting one or more issues maintained by an issue tracking system for balancing, the method comprising:
determining a pivot issue maintained by the issue tracking system;
adding the pivot issue to a set of issues, the set of issues being issues that are to be balanced;
sequentially analyzing issues in a first direction from the pivot issue, the issues in the first direction having successively adjacent rank values in the first direction to a rank value of the pivot issue and, for each successive first direction issue in the first direction:
determining whether selection termination criteria are met in respect of the first direction issue; and
in response to determining that selection termination criteria are not met in respect of the first direction issue, adding the first direction issue to the set of issues and proceeding to analyse the next issue in the first direction.

ISE clause 2. The computer implemented method of ISE clause 1, further comprising:
sequentially analyzing issues in a second direction from the pivot issue, the second direction opposite the first direction, the issues in the second direction having successively adjacent rank values in the second direction to a rank value of the pivot issue and, for each successive second direction issue in the second direction:
determining whether selection termination criteria are met in respect of the second direction issue; and
in response to determining that selection termination criteria are not met in respect of the second direction issue, adding the second direction issue to the set of issues and proceeding to analyse the next issue in the second direction.

ISE clause 3. The computer implemented method of ISE clause 1 or ISE clause 2, wherein in response to determining selection termination criteria are met in respect of a first direction issue the method comprises ceasing to analyse issues in the first direction.

ISE clause 4. The computer implemented method of ISE clause 2, wherein in response to determining selection termination criteria are met in respect of a second direction issue the method comprises ceasing to analyse issues in the second direction.

ISE clause 5. The computer implemented method of any one of ISE clauses 1 to 4, wherein the first direction is a descending direction in which issues having successively adjacent rank values to the rank value of the pivot issue are issues having successively lower rank values to the rank value of the pivot issue.

ISE clause 6. The computer implemented method of any one of ISE clauses 1 to 4, wherein the first direction is an ascending direction in which issues having successively adjacent rank values to the rank value of the pivot issue are issues having successively higher rank values to the rank value of the pivot issue.

ISE clause 7. The computer implemented method of any one of ISE clauses 1 to 6, wherein determining the pivot issue comprises:
identifying a longest rank length issue, the longest rank length issue having a rank length equal to a longest rank length of all issues maintained by the issue tracking system; and
determining the longest rank length issue to be the pivot issue.

ISE clause 8. The computer implemented method of any one of ISE clauses 1 to 6, wherein determining the pivot issue comprises:
identifying a threshold rank length issue, the threshold rank length issue having a rank length equal or greater to a predefined threshold rank length; and
determining the threshold rank length issue to be the pivot issue.

ISE clause 9. The computer implemented method of any one of ISE clauses 1 to 8, wherein the method results in a subset of all issues maintained by the issue tracking system being added to the set of issues.

ISE clause 10. The computer implemented method of any one of ISE clauses 1 to 9, wherein:
the selection termination criteria comprise a minimum rank length criterion; and
if a rank length of a given issue is less than or equal to a minimum rank length defined by the minimum rank length criteria the selection termination criteria are met.

ISE clause 11. The computer implemented method of any one of ISE clauses 1 to 10, wherein:
the selection termination criteria comprise a maximum rank distance criterion; and
if a rank distance between a rank of a given issue and a rank of the pivot issue exceeds a maximum rank distance defined by the maximum rank distance criterion the selection termination criteria are met.

ISE clause 12. The computer implemented method of any one of ISE clauses 1 to 11, wherein:
the selection termination criteria comprise a maximum number of issues criterion; and
if adding a particular issue to the set of issues would result in the number of issues added to the set of issues exceeding a maximum number of issues defined by the maximum number of issues criterion the selection termination criteria are met.

ISE clause 13. A system for selecting one or more issues maintained by an issue tracking system for balancing, the system comprising:
one or more processors;
one or more non-transitory computer-readable storage media storing sequences of instructions which, when executed by the one or more processors, cause the one or more processors to implement a method according to any one of ISE clauses 1 to 12.

ISE clause 14: Non-transitory computer-readable storage media storing sequences of instructions which, when executed a processor, cause the processor to implement a method according to any one of ISE clauses 1 to 12.

Issue Balancing

Figure 10:
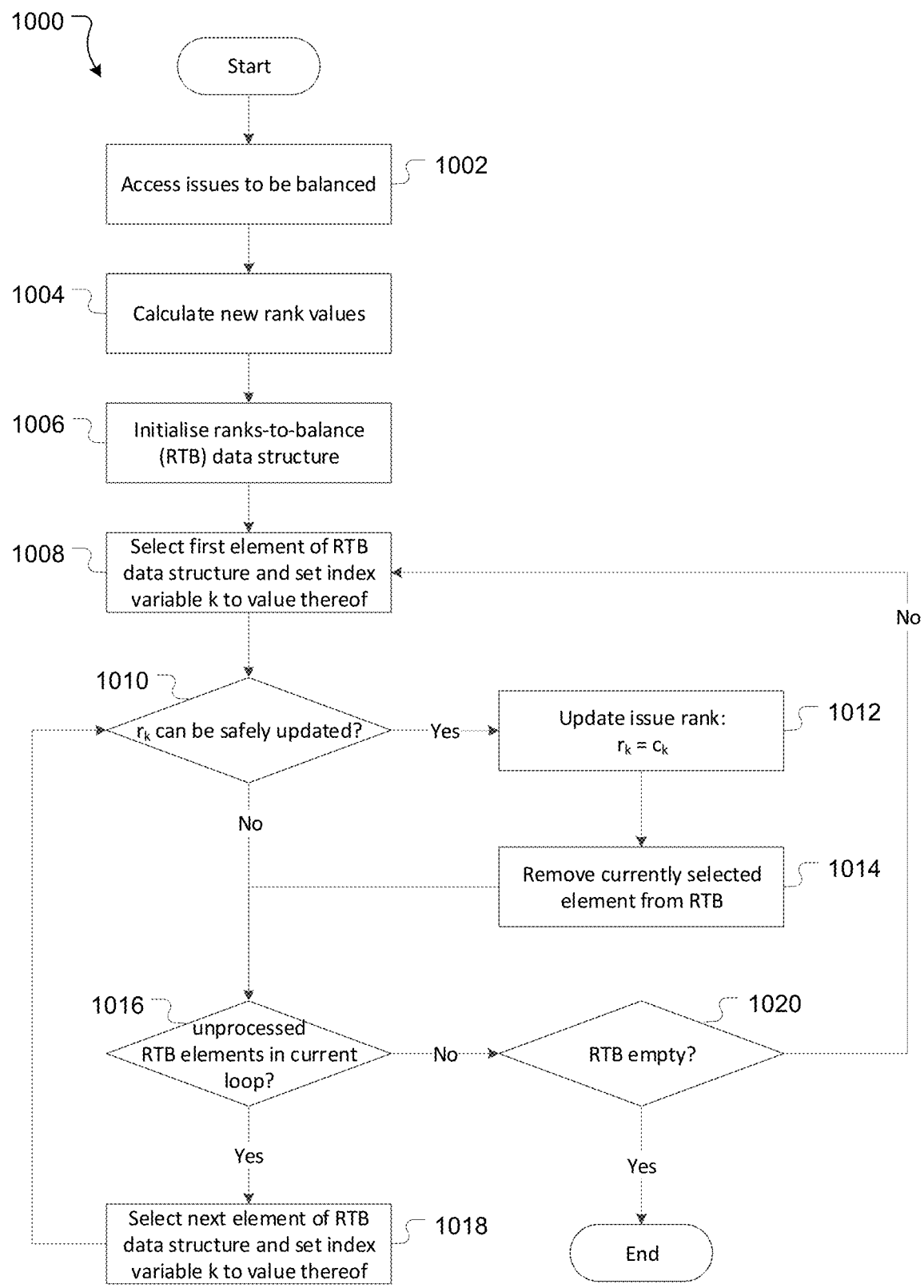
FIG. 10 is a flowchart depicting operations involved in balancing issues.

Turning to FIG. 10, a process 1000 for balancing a set of issues maintained by an issue tracking system will be described. In certain embodiments, the set of issues to be balanced is determined according to a process such as process 800 described above. The set of issues may, however, be alternatively determined/selected.

At 1002, the ITS server 104 accesses the set of issues that are to be balanced (for example as identified in process 800). The set may recorded in various ways, but will include (or allow retrieval of) at least issue identifiers and their corresponding ranks—e.g.:

| Issue identifier | Existing Issue Rank |
| --- | --- |
| Issue 1 ID | $r_1$ |
| Issue 2 ID | $r_2$ |
| ... | ... |
| Issue n-1 ID | $r_{n-1}$ |
| Issue n ID | $r_n$ |

The set of ranks to be balanced R can be written:

$$R=\{r_1,r_2,r_3,\ldots,r_{n-1},r_n\}$$

Each element of set R being an issue rank corresponding to a particular issue (as identified by an issue identifier), with n being the number of issues/ranks that are to be balanced.

At 1004, the ITS server 104 calculates new rank values for the issues that are to be balanced. Generally speaking this involves calculating rank values to spread the issue ranks out relatively evenly between the issue that is to be balanced that has the lowest rank and the issue that is to be balanced that has the highest rank.

One way of achieving this is as follows, with the set of recalculated ranks C written as:

$$C=\{c_1,c_2,c_3,\ldots,c_{n-1},c_n\}$$

Where a given element of C provides the recalculated rank for the corresponding element of R. I.e. $c_k$ is the recalculated rank of $r_k$.

In the rank recalculation process, the lowest and highest ranked issues retain their existing ranks—i.e.:

$$c_1=r_1$$

$$c_n=r_n$$

For each rank aside from the first and last ranks (i.e. for each rank $r_k$ where 2<=k<=n-1) a new rank value is calculated. The new rank value is calculated in order that ranks are approximately equidistant—i.e.:

$$r_k=r_1+(r_n-r_1)/(n-1)*(k-1)$$

In order to reduce rank length, the newly calculated rank is then rounded. The system can be configured to round newly calculated ranks up, down, to up/down depending on the closest next significant rank character. In the present embodiment this involves comparing the newly calculated rank to the previously calculated (or assigned) rank and retaining only as many rank characters as are required to maintain the condition $c_k>c_{k-1}$.

For example, if the set of ranks to be balanced R is {0.0, 0.11111111, 0.2222222222, 1.0}
$c_1$ is assigned the value of $r_1$—i.e. 0.0
$c_2$=0.0+(1.0−0.0)/(4−1)*(2−1)=1.0/3*1=0.3 recurring.
This is then rounded down to 0.3, as $C_1$=0.0 and 0.3 >0.0.
$c_3$=0.0+(1.0−0.0)/(4−1)*(3−1)=1.0/3*2=0.6 recurring. In the present embodiment, ranks are rounded down so this is then rounded down to 0.6, as $C_2$=0.3 and 0.6>0.3.
$c_4$ is assigned the value of $r_4$—i.e. 1.0.
This yields a set of recalculated ranks C as follows:
{0.0, 0.3, 0.6, 1.0}
To further illustrate rounding, if $c_2$ was instead equal to 0.66666, $c_3$ could only be rounded from 0.6 recurring down to 0.666666, as no further characters can be removed without violating the condition $c_k>c_{k-1}$.

Following calculation of the new rank values at 1002, the ITS server 104 balances the issues by assigning them their new rank values—i.e. updating $\{r_1, r_2, r_3, r_{n-1}, r_n\}$ to $\{c_1, c_2, c_3, \ldots, c_{n-1}, c_n\}$. In order to do this, however, care must be taken not to change the rank order of the issues—even temporarily.

The potential issue that arises is illustrated as follows. If updating was performed sequentially starting from k=1 (i.e. the lowest currently ranked issue) and balancing in increasing rank order this could result in temporarily changing the order of the ranks. Consider, for example, an initial rank set of R={0.0, 0.11111111, 0.2222222222, 1.0}—e.g. (using arbitrary issue identifiers):

| Issue identifier | Existing Issue Rank |
| --- | --- |
| 1 | 0.0 |
| 2 | 0.11111111 |
| 3 | 0.2222222222 |
| 4 | 1.0 |

Example Initial Issue Ranks

And a recalculated rank set of C={0.0, 0.3, 0.6, 1.0}—e.g.:

| Issue identifier | Recalculated issue Rank |
| --- | --- |
| 1 | 0.0 |
| 2 | 0.3 |
| 3 | 0.6 |
| 4 | 1.0 |

Example Recalculated Issue Ranks

If the first two ranks were updated sequentially, a snapshot of the issue rankings would be:

| Issue identifier | Issue Rank |
| --- | --- |
| 1 | 0.0 [updated to new rank] |
| 2 | 0.3 [updated to new rank]] |
| 3 | 0.2222222222 [yet to be updated] |
| 4 | 1.0 [yet to be updated] |

Snapshot Following Update of First Two Issue Ranks (Moving from Lowest Ranked Issue to Highest)

As can be seen, if the issues were queried at this point (or the reordering process interrupted and no further reordering performed) the order of the issues has changed—with issue ID 2 now ranking after issue ID 3 instead of before.

In order to address this issue, the present embodiment provides an updating algorithm which ensures that the order of the issues does not change. This provides a number of advantages, for example that the balancing process can be stopped or paused (either manually or due to a software/hardware failure) without fear that an inadvertent reordering of issues will occur.

At 1006, the ITS server 104 initialises a ranks-to-balance data structure (or RTB for short) which is used to maintain a record of which issue ranks need to be updated. The RTB data structure may, for example be an array or set of ascending integers with a number of elements equal to the number of issues that are to be balanced—e.g.

$$RTB = \{1, 2, \ldots, n-1, n\}$$

Where n=the number of issues to be balanced (which equals the number of elements in set R).

In the present embodiment, therefore, the update process, therefore, involves working with three data sets:

The original issue ranks $R=\{r_1, r_2, r_3, \ldots, r_{n-1}, r_n\}$ (ordered such that $r_{k-1} < r_k < r_{k+1}$)

The recalculated ranks $C=\{c_1, c_2, c_3, c_{n-i}, c_n\}$ (where $c_{k-1} < c_k < c_{k+1}$)

The RTB=$\{1, 2, \ldots, n-1, n\}$

At 1008, the ITS sever 104 selects the first element of the RTB set and sets an index variable k to the value of that first element. In the present example, the value of the first element will be k=1 in the first processing loop. As described below, however, each processing loop results in one or more elements being removed from the RTB set (as the corresponding issue ranks are updated), so in subsequent processing loops the value of the first element of the RTB set will not necessarily be 1.

At 1010, the ITS server 104 determines if $r_k$ (i.e. the rank of the issue with the index matching the current value of the index variable k) can safely be updated to the recalculated rank $c_k$. An update of $r_k$ to $c_k$ is safe only if it does not change the order of the ranks—i.e. if and only if $r_{k-1} < c_{k+1}$.

If, at 1010, the ITS server 104 determines that $r_k$ can be safely updated, processing continues to 1012. At 1012, the ITS server 104 updates the rank of $r_k$ with $c_k$—i.e. $r_k = c_k$. Actual updating of an issue rank can be performed in various ways. One such way is described in section 2 of U.S. Pat. No. 10,282,685 titled "Issue rank management in an issue tracking system".

At 1014, the ITS server 104 removes the currently selected RTB element from the RTB set (i.e. either the first element as selected at 1006, or a later element as selected at 1018. Processing then continues to 1016.

If, at 1010, the ITS server 104 If, at 1008, the ITS sever 104 determines that $r_k$ cannot be safely updated, processing also continues to 1016.

At 1016, the ITS server 104 determines whether the RTB set has additional elements that have not yet processed in the current processing loop.

If, at 1016, the ITS server 104 determines that the RTB set does have one or more elements that have not been processed in the current loop, processing continues to 1018. At 1018, the ITS server 104 selects the next unprocessed element in the RTB set and updates the index variable k to the value of that element. Processing then returns to 1010.

If, at 1016, the ITS server 104 determines that the RTB set does not have any elements that have not been processed in the current loop, processing continues to 1018. At 1020, the ITS server 104 determines if the RTB set is empty (i.e. if all elements have been removed).

If, at 1020, the ITS server 104 determines that the RTB is empty, all issue ranks have been updated and issue balancing is complete.

If, at 1020, the ITS server 104 determines that the RTB set is not empty, processing returns to 1008 and the ITS server 104 iterates through the elements of the RTB set again.

The inventors have identified that for any given processing loop of the RTB set there will be at least one issue rank that can be updated. The proof of this is as follows.

As noted, update of $r_k$ to $c_k$ is safe only if $r_{k-1} < c_k < r_{k+1}$.

If $c_1 < r_2$ the first rank can be safely updated (in which case at least one rank can be updated in a safe manner).

If the first rank cannot be safely updated, $r_2 <= c_1$.

If $r_1 < c_2 < r_3$, the second rank can be safely updated (in which case at least one rank can be updated in a safe manner).

If the second rank cannot be safely updated ($r_3 <= c_2$ or $r_1 >= c_2$).

However, we know that $r_1 >= c_2$ is not true, because $r_2 <= c_1$ and $r_1 < r_2 => r_1 < c_1$.

Accordingly, ($r_3 <= c_2$ or $r_1 >= c_2$) can only be true if $r_3 <= c_2$ is true.

Following the same reasoning, it can be proved that:

The third rank can't safely be updated if and only if $r_4<=c_3$ is true, the fourth rank if and only if $r_5<=c_4$ is true, the k-th rank if and only if $r_{k+1}<=c_k$ However, once k=n−1 is reached, $r_n=c_n$ per the rank recalculation process described above (which is the same as $r_{k+1}=c_{k+1}$). Therefore, $r_{k+1}<=c_k$ can be transformed into $c_{k+1}<=c_k$, which is never true.

This proves, therefore, that the situation where at least one rank cannot be safely updated never exists.

Once rank k has been updated, the initial sets can then be divided while still maintaining the invariants (because $r_k$ is now equal to $c_k$). I.e.:

$\{r_1, r_2, r_3, \ldots, r_{n-1}, r_n\}$ can be divided into $\{r_1, r_2, r_3, \ldots, r_{k-1}, r_k\}$ and $\{r_k, r_{k+1}, r_{k+2}, \ldots, r_{n-1}, r_n\}$.

And $\{c_1, c_2, c_3, \ldots, c_{n-1}, c_n\}$ can be divided into $\{c_1, c_2, c_3, \ldots, c_{k-1}, c_k\}$ and $\{c_k, c_{k+1}, c_{k+2}, \ldots, c_{n-1}, c_n\}$.

The same proof as above can then be used for each of the two subsets to prove that there is at least one rank we can safely update. Each of the two subsets can then be divided into further two subsets, and so on. Once subsets of size 1 or 2 are reached, the entire set is balanced.

Process 1000 as described above involves looping through the set of issues that require balancing (i.e. a rank update) until an issue that can be safely rebalanced is identified. The RTB provides one mechanism for recording the current position in the processing and the issues that still require rank updates. Alternative mechanisms are, however, available. In addition, while process 1000 involves working through the elements of the RTB sequentially in ascending order, the elements of the RTB could be processed in any order. Still further, process 1000 involves working through all elements of the RTB in a given processing loop (before returning to the first element and starting a new loop). In alternative embodiments, however, each time a rank is updated and an element removed from the RTB (e.g. at 1012/1014) a new processing loop may begin by going back to the start of the RTB (i.e. returning to 1008).

Furthermore, in process 1000 elements are removed from the RTB (at 1014) when the element's corresponding issue rank has been updated. In alternative embodiments, instead of removing elements from the RTB at 1014 elements may be flagged in some way to indicate that the element's corresponding issue rank has been updated. In this case, only RTB elements that have not been so flagged are considered when iterating through the RTB set.

U.S. Pat. No. 10,282,685 titled "Issue rank management in an issue tracking system" describes an issue ranking scheme in which issues are ranked in 'buckets' (by use of an issue rank balancing component), and a balancing process in which all issues maintained by the ITS are balanced by moving all issues from one bucket to another (see section 3 of that patent). The present balancing techniques can be used in conjunction with such a ranking scheme in order to select a subset of issues—i.e. where there is local congestion—and rebalance that subset of issues without rebalancing all issues maintained by the ITS. In this case localized congestion can be relieved without having to rebalance every issue maintained by the ITS, thus avoiding the performance and processing overhead associated with reranking every single issue. In order to apply the present techniques to an issue rank scheme with a balancing component, the balancing component can effectively be ignored: issues are selected from within the current bucket and balanced within that bucket (i.e. without moving any issues into a new bucket Issue Balancing Embodiments Further examples of specific feature combinations taught within the present disclosure are set out in the following numbered clauses:

IBE clause 1. A computer implemented method for balancing a set of issues maintained by an issue tracking system, each issue in the set of issues having an original rank value, the method comprising:
  determining a set of new rank values, the set of new rank values comprising a new rank value for each issue in the set of issues;
  selecting a first issue from the set of issues, the first issue being an issue from set of issues that is neither a lowest ranked issue or highest ranked issue;
  determining whether the first issue can be safely re-ranked based on the new rank value calculated for the first issue and original rank values of issues adjacent to the first issue; and
  in response to determining that the first issue can safely be re-ranked, re-ranking the first issue by assigning the new rank value determined for the first issue to the first issue.

IBE clause 2. The computer implemented method according to IBE clause 1, wherein the method further comprises:
  successively selecting further issues from the set of issues for processing, wherein processing a given further issue comprises:
  determining whether the given further issue can be safely re-ranked;
    in response to determining that the given further issue from the set of issues can safely be re-ranked, re-ranking the given further issue and selecting another further issue for processing;
    in response to determining that the given further issue from the set of issues cannot safely be re-ranked, selecting another further issue for processing without re-ranking the given further issue.

IBE clause 3. The computer implemented method according to IBE clause 2, wherein following selection of all issues in the set of issues, the method comprises:
  re-selecting any issues that on initial selection were determined not able to be safely re-ranked; and
  in response to determining that a re-selected issue can safely be re-ranked, re-ranking the re-selected issue.

IBE clause 4. The computer implemented method according to IBE clause 2, wherein the first issue is an issue from the set of issues with the second lowest rank value, and wherein successively selecting further issues comprises selecting issues with successively higher rank values to the first issue.

IBE clause 5. The computer implemented method according to IBE clause 2, wherein the first issue is an issue from the set of issues with the second highest rank value, and wherein successively selecting further issues comprises selecting issues with successively lower rank values to the first issue.

IBE clause 6. The computer implemented method according to any one of IBE clauses 1 to 5, wherein determining a set of new rank values comprises:
  setting a new rank value for a lowest ranked issue in the set of issues to be the original rank value of the lowest ranked issue; and
  setting a new rank value for a highest ranked issue in the set of issues to be the original rank value of the highest ranked issue.

IBE clause 7. The computer implemented method according to IBE clause 6, wherein determining a set of new rank values further comprises:
calculating new rank values for each interim issue in the set of issues, an interim issue in the set of issues being an issue with a rank value between the rank values of the lowest and highest ranked issues in the set of issues, and wherein calculating new rank values for each interim issue comprises calculating new rank values that are approximately equally distributed between the between the rank values of the lowest and highest ranked issues in the set of issues.

IBE clause 8. The computer implemented method according to IBE clause 7, wherein calculating a new rank value for a given interim issue comprises calculating a new rank value according to the formula:

$$r_k = r_1 + (r_n - r_1)/(n-1)*(k-1)$$

wherein:
k is an index position of the given interim issue within the set of issues, k being between 1 (an index position of the lowest ranked issue in the set of issues) and; n (an index position of the highest ranked issue in the set of issues);
$r_k$ is the new rank value for the given interim issue;
$r_1$ is the rank value of the lowest ranked issue in the set of issues; and
$r_n$ is the rank value of the highest ranked issue in the set of issues IBE clause 9. The computer implemented method according to IBE clause 8, wherein calculating a new rank value for a given interim issue further comprises rounding the newly calculated rank value $r_k$ such that $r_k$ has a minimum number of rank characters but is still greater than a rank value of an issue with the next lowest rank value.

IBE clause 10. The computer implemented method according to any one of IBE clauses 1 to 9, further comprising selecting the set of issues according to an issue selection process as described in any one of the issue selection clauses ISE 1 to 11 above.

IBE clause 11. A system for performing an issue balancing process, the system comprising:
one or more processors;
one or more non-transitory computer-readable storage media storing sequences of instructions which, when executed by the one or more processors, cause the one or more processors to implement a method according to any one of IBE clauses 1 to 10.

IBE clause 12. Non-transitory computer-readable storage media storing sequences of instructions which, when executed by a processor, cause the processor to implement a method according to any one of IBE clauses 1 to 10.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
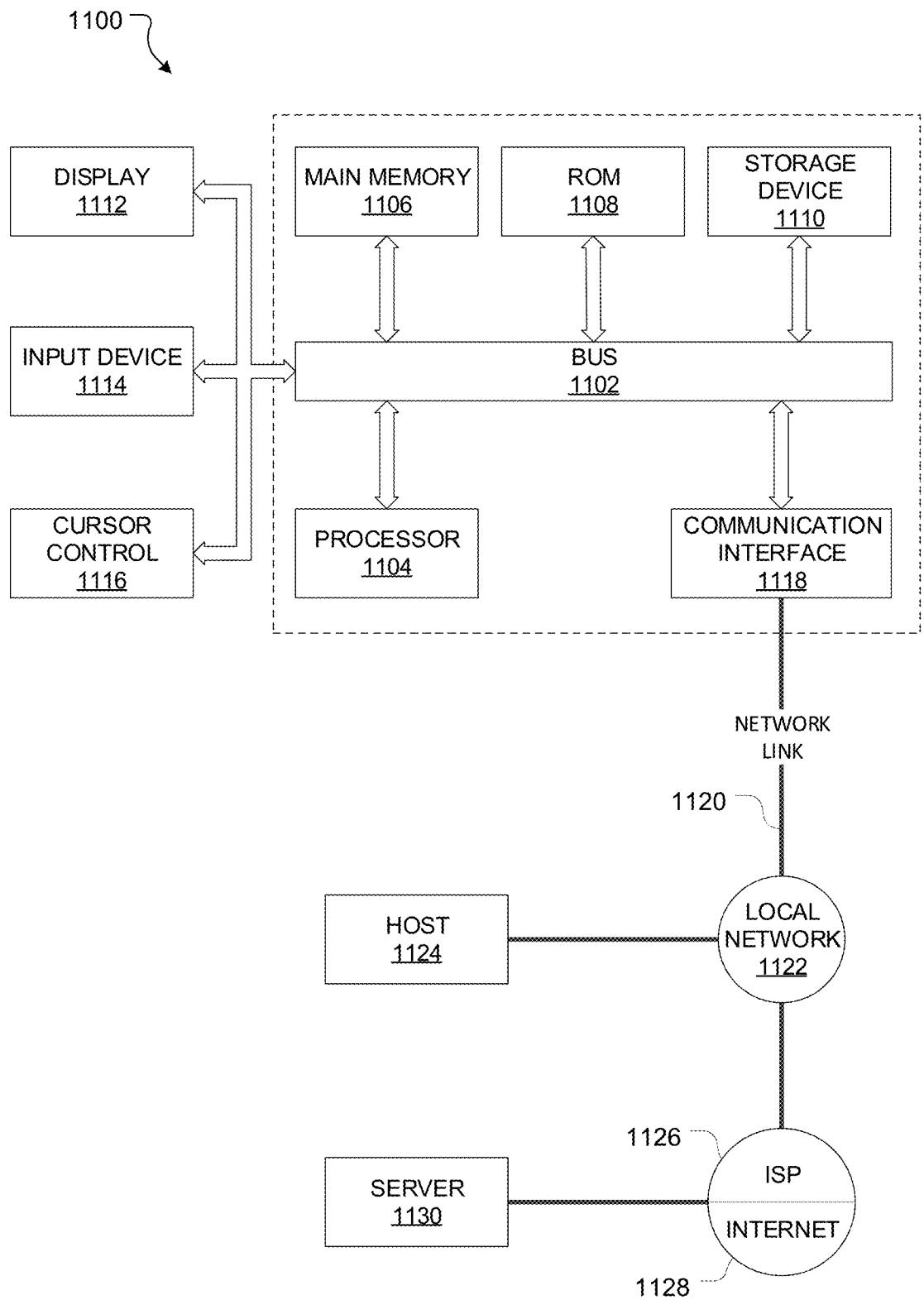
FIG. 11 illustrates a computer system with which various embodiments may be used.

For example, FIG. 11 is a block diagram that illustrates a computer system 1100 upon which an embodiment of the invention may be implemented. Computer system 1100 includes a bus 1102 or other communication mechanism for communicating information, and a hardware processor 104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 102 to one more output devices such as a display 112 for displaying information to a computer user. Display 112 may, for example, be a cathode ray tube (CRT), a liquid crystal display (LCD), a light emitting diode (LED display), or a touch screen display. An input device 1114, including alphanumeric and other keys, may be coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Additional and/or alternative input devices are possible, for example touch screen displays.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 106. Such instructions may be read into main memory 106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example user computer 112 may be a desktop computer, a laptop computer, a notebook computer, a tablet computer, a smart phone, or other another computer.

A number of flowcharts are provided herein in order to illustrate processing or functional operations. Although these flowcharts define operations in particular orders to explain various features, in some cases the operations may be able to be performed in a different order. Furthermore, in some cases one or more operations may be combined into a single operation, a single operation may be divided into multiple separate operations, and/or the function(s) achieved by one or more of the described/illustrated operations may be achieved by one or more alternative operations.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for balancing rank values of a set of issues maintained in a database of an issue tracking system to reduce clustering, each issue in the set of issues having an original rank value, the method comprising:
    identifying a cluster of original rank values from the set of issues;
    selecting a subset of issues from the set of issues, the subset of issues based on the identified cluster;
    determining a set of new rank values, the set of new rank values comprising a new rank value for at least one issue in the subset of issues;
    selecting a first issue from the subset of issues, the first issue being an issue from subset of issues that is neither a lowest ranked issue or highest ranked issue;
    determining whether the first issue can be safely re-ranked, such that the first issue maintains a sort order relative to at least one adjacently-ranked issue, based on the new rank value calculated for the first issue and original rank values of issues adjacent to the first issue;
    in response to determining that the first issue can safely be re-ranked, re-ranking the first issue by assigning the new rank value determined for the first issue to the first issue; and
    in response to determining that the first issue cannot be safely re-ranked, delaying re-ranking of the first issue until it is determined that the first issue can be re-ranked safely.

2. The computer-implemented method of claim 1, wherein the method further comprises:
    successively selecting further issues from the set of issues for processing, wherein processing a given further issue comprises:
        determining whether the given further issue can be safely re-ranked;
        in response to determining that the given further issue from the set of issues can safely be re-ranked, re-ranking the given further issue and selecting another further issue for processing;
        in response to determining that the given further issue from the set of issues cannot safely be re-ranked, selecting another further issue for processing without re-ranking the given further issue.

3. The computer-implemented method of claim 2, wherein following selection of all issues in the set of issues, the method comprises:
    re-selecting any issues that on initial selection were determined not able to be safely re-ranked; and
    in response to determining that a re-selected issue can safely be re-ranked, re-ranking the re-selected issue.

4. The computer-implemented method of claim 2, wherein the first issue is an issue from the set of issues with the second lowest rank value, and wherein successively selecting further issues comprises selecting issues with successively higher rank values to the first issue.

5. The computer-implemented method of claim 2, wherein the first issue is an issue from the set of issues with the second highest rank value, and wherein successively selecting further issues comprises selecting issues with successively lower rank values to the first issue.

6. The computer-implemented method of claim 1, wherein determining a set of new rank values comprises:
    setting a new rank value for a lowest ranked issue in the set of issues to be the original rank value of the lowest ranked issue; and
    setting a new rank value for a highest ranked issue in the set of issues to be the original rank value of the highest ranked issue.

7. The computer-implemented method of claim 6, wherein determining a set of new rank values further comprises:
    calculating new rank values for each interim issue in the set of issues, an interim issue in the set of issues being an issue with a rank value between the rank values of the lowest and highest ranked issues in the set of issues, and wherein calculating new rank values for each interim issue comprises calculating new rank values that are approximately equally distributed between the between the rank values of the lowest and highest ranked issues in the set of issues.

8. The computer-implemented method of claim 7, wherein calculating a new rank value for a given interim issue comprises calculating a new rank value according to the formula:

$$rk=r1+(rn-r1)/(n-1)*(k-1)$$

wherein:
    k is an index position of the given interim issue within the set of issues, k being between an index position u of the lowest ranked issue in the set of issues and; an index position n of the highest ranked issue in the set of issues;
    rk is the new rank value for the given interim issue;
    r1 is the rank value of the lowest ranked issue in the set of issues; and
    rn is the rank value of the highest ranked issue in the set of issues.

9. The computer-implemented method of claim 8, wherein calculating a new rank value for a given interim issue further comprises rounding the newly calculated rank value rk such that rk has a minimum number of rank characters but is still greater than a rank value of an issue with the next lowest rank value.

10. The computer-implemented method of claim 1, further comprising selecting the set of issues according to an issue selection process comprising:
    determining a pivot issue maintained by the issue tracking system;
    adding the pivot issue to the set of issues;
    sequentially analyzing issues in a first direction from the pivot issue, the issues in the first direction having successively adjacent rank values in the first direction to a rank value of the pivot issue and, for each successive first direction issue in the first direction:
    determining whether selection termination criteria are met in respect of the first direction issue; and
    in response to determining that selection termination criteria are not met in respect of the first direction issue, adding the first direction issue to the set of issues and proceeding to analyze the next issue in the first direction.

11. A system for performing an issue rank balancing process to reduce issue rank clustering in a database of issue ranks use by an issue tracking system to order issues maintained by the issue tracking system, the system comprising:
one or more processors;
one or more non-transitory computer-readable storage media storing instructions which, when executed by the one or more processors, cause the one or more processors to:
identifying, from the database, a cluster of original rank values from a set of issues maintained by the issue tracking system;
selecting a subset of issues from the set of issues, the subset of issues based on the identified cluster;
determine a set of new rank values, the set of new rank values comprising a new rank value for at least one issue in the subset of issues;
select a first issue from the subset of issues, the first issue being an issue from subset of issues that is neither a lowest ranked issue or highest ranked issue among the subset of issues;
determine whether the first issue can be safely re-ranked such that a relative order of the first issue within the subset of issues is unchanged if modified to the new rank;
in response to determining that the first issue can safely be re-ranked, re-ranking the first issue by assigning the new rank value determined for the first issue to the first issue; and
in response to determining that the first issue cannot be safely re-ranked, delaying re-ranking of the first issue until it is determined that the first issue can be re-ranked safely.

12. The system of claim 11, wherein when executed by the one or more processors the sequences of instructions cause the one or more processors to:
successively select further issues from the set of issues for processing, wherein processing a given further issue comprises:
determining whether the given further issue can be safely re-ranked;
in response to determining that the given further issue from the set of issues can safely be re-ranked, re-ranking the given further issue and selecting another further issue for processing;
in response to determining that the given further issue from the set of issues cannot safely be re-ranked, selecting another further issue for processing without re-ranking the given further issue.

13. The system of claim 12, wherein following selection of all issues in the set of issues, the sequences of instructions cause the one or more processors to:
re-select any issues that on initial selection were determined not able to be safely re-ranked; and
in response to determining that a re-selected issue can safely be re-ranked, re-rank the re-selected issue.

14. The system of claim 12, wherein the first issue is an issue from the set of issues with the second lowest rank value, and wherein successively selecting further issues comprises selecting issues with successively higher rank values to the first issue.

15. The system of claim 12, wherein the first issue is an issue from the set of issues with the second highest rank value, and wherein successively selecting further issues comprises selecting issues with successively lower rank values to the first issue.

16. The system of claim 11, wherein determining a set of new rank values comprises:
setting a new rank value for a lowest ranked issue in the set of issues to be the original rank value of the lowest ranked issue; and
setting a new rank value for a highest ranked issue in the set of issues to be the original rank value of the highest ranked issue.

17. The system of claim 16, wherein determining a set of new rank values further comprises:
calculating new rank values for each interim issue in the set of issues, an interim issue in the set of issues being an issue with a rank value between the rank values of the lowest and highest ranked issues in the set of issues, and wherein calculating new rank values for each interim issue comprises calculating new rank values that are approximately equally distributed between the between the rank values of the lowest and highest ranked issues in the set of issues.

18. The system of claim 17, wherein calculating a new rank value for a given interim issue comprises calculating a new rank value according to the formula:

$$rk = r1 + (rn - r1)/(n - 1) * (k - 1)$$

wherein:
k is an index position of the given interim issue within the set of issues, k being between an index position u of the lowest ranked issue in the set of issues and; an index position n of the highest ranked issue in the set of issues;
rk is the new rank value for the given interim issue;
r1 is the rank value of the lowest ranked issue in the set of issues; and
rn is the rank value of the highest ranked issue in the set of issues.

19. The system of claim 18, wherein calculating a new rank value for a given interim issue further comprises rounding the newly calculated rank value rk such that rk has a minimum number of rank characters but is still greater than a rank value of an issue with the next lowest rank value.

20. The system of claim 11, wherein when executed by the one or more processors the sequences of instructions cause the one or more processors to select the set of issues by:
determining a pivot issue maintained by the issue tracking system;
adding the pivot issue to the set of issues;
sequentially analyzing issues in a first direction from the pivot issue, the issues in the first direction having successively adjacent rank values in the first direction to a rank value of the pivot issue and, for each successive first direction issue in the first direction:
determining whether selection termination criteria are met in respect of the first direction issue; and
in response to determining that selection termination criteria are not met in respect of the first direction issue, adding the first direction issue to the set of issues and proceeding to analyze the next issue in the first direction.

* * * * *